(12) United States Patent
El-Ghoroury et al.

(10) Patent No.: US 7,835,079 B2
(45) Date of Patent: Nov. 16, 2010

(54) MICRO-STRUCTURE BASED SCREEN SYSTEM FOR USE IN REAR PROJECTION ARRAY DISPLAY SYSTEMS

(75) Inventors: Hussein S. El-Ghoroury, Carlsbad, CA (US); Dale A. McNeill, Encinitas, CA (US); Jingbo Cai, Vista, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 562 days.

(21) Appl. No.: 11/786,386

(22) Filed: Apr. 10, 2007

(65) Prior Publication Data

US 2008/0218853 A1    Sep. 11, 2008

Related U.S. Application Data

(60) Provisional application No. 60/905,420, filed on Mar. 6, 2007.

(51) Int. Cl.
*G03B 21/60* (2006.01)
(52) U.S. Cl. .................. 359/456; 359/460; 353/30
(58) Field of Classification Search ......... 359/445–457; 353/30, 79; 348/745, 840
See application file for complete search history.

(56) References Cited

U.S. PATENT DOCUMENTS

| | | | | |
|---|---|---|---|---|
| 4,502,755 A | * | 3/1985 | Mori et al. ................. | 359/456 |
| 4,993,806 A | * | 2/1991 | Clausen et al. ............. | 359/456 |
| 5,206,761 A | * | 4/1993 | Ogino ....................... | 359/457 |
| 5,563,738 A | | 10/1996 | Vance | |
| 5,609,939 A | | 3/1997 | Petersen et al. | |
| 5,870,224 A | | 2/1999 | Saitoh et al. | |
| 6,097,539 A | * | 8/2000 | Clausen ..................... | 359/456 |
| 6,151,162 A | | 11/2000 | Van De Ven | |
| 6,219,099 B1 | | 4/2001 | Johnson et al. | |
| 6,278,546 B1 | | 8/2001 | Dubin et al. | |
| 6,310,650 B1 | | 10/2001 | Johnson et al. | |

(Continued)

FOREIGN PATENT DOCUMENTS

EP    1 441 253 A1    7/2004

(Continued)

OTHER PUBLICATIONS

R. Bruce Herrick, "Rear Projection Screens: a Theoretical Analysis", *Applied Optics*, (May 1968), vol. 7, No. 5, pp. 763-771.

(Continued)

*Primary Examiner*—Christopher E Mahoney
*Assistant Examiner*—Leon W Rhodes
(74) *Attorney, Agent, or Firm*—Blakely Sokoloff Taylor & Zafman LLP

(57) ABSTRACT

The viewing angle brightness sensitivity typically encountered in tiled rear projection display systems cannot be solely overcome by edge blending and calibration techniques. The rear projection array display-screen system of this invention, being comprised of a micro-structure array screen combined with a conventional diffusion screen, overcomes this viewing angle brightness sensitivity in both linear as well as matrix tiled rear projection display systems including those that use wide field-of-view projectors. The latter capability enables low form-factor and compact packaging of tiled rear projection display systems.

41 Claims, 11 Drawing Sheets

U.S. PATENT DOCUMENTS

| | | | |
|---|---|---|---|
| 6,377,306 B1 | 4/2002 | Johnson et al. | |
| 6,456,339 B1 | 9/2002 | Surati et al. | |
| 6,469,830 B1 | 10/2002 | Dubin et al. | |
| 6,525,772 B2 | 2/2003 | Johnson et al. | |
| 6,558,006 B2 | 5/2003 | Ioka | |
| 6,597,502 B2 | 7/2003 | Takahashi et al. | |
| 6,624,934 B1 | 9/2003 | Moshrefzadeh et al. | |
| 6,695,451 B1 | 2/2004 | Yamasaki et al. | |
| 6,700,703 B2 | 3/2004 | Funazaki et al. | |
| 6,733,138 B2 | 5/2004 | Raskar | |
| 6,755,537 B1 | 6/2004 | Raskar et al. | |
| 6,816,306 B2 | 11/2004 | Freese et al. | |
| 6,829,086 B1 | 12/2004 | Gibilini | |
| 6,829,087 B2 | 12/2004 | Freese et al. | |
| 6,833,951 B2 | 12/2004 | Kolosowsky | |
| 6,864,921 B2 | 3/2005 | Kaneda et al. | |
| 6,869,195 B2 | 3/2005 | Hannington | |
| 6,942,959 B2 | 9/2005 | Dubin et al. | |
| 6,967,779 B2 | 11/2005 | Fadel et al. | |
| 6,970,288 B2 | 11/2005 | Ebina et al. | |
| 2005/0264880 A1 | 12/2005 | Kim et al. | |
| 2006/0001975 A1* | 1/2006 | Miyata | 359/619 |
| 2006/0132911 A1 | 6/2006 | Ogawa et al. | |
| 2006/0238723 A1 | 10/2006 | El-Ghoroury | |

FOREIGN PATENT DOCUMENTS

| | | |
|---|---|---|
| EP | 1 744 209 A1 | 1/2007 |
| JP | 2007/017790 | 1/2007 |

OTHER PUBLICATIONS

"International Search Report and Written Opinion of the International Searching Authority Dated Jul. 21 2008", International Application No. PCT/US2008/002661.

* cited by examiner

MICRO-STRUCTURE BASED SCREEN SYSTEM FOR USE IN REAR PROJECTION ARRAY DISPLAY SYSTEMS

CROSS-REFERENCE TO RELATED APPLICATION

This application claims the benefit of U.S. Provisional Patent Application No. 60/905,420 filed Mar. 6, 2007.

BACKGROUND OF THE INVENTION

1. Field of the Invention

The present invention relates to the field of back-illuminated screens.

2. Prior Art

The advent of digital high definition (HD) video technology is causing a phenomenal demand for HD televisions (HDTV) and HD display devices with large screen sizes having high brightness characteristics. Several display technologies are poised to address this demand; including Plasma Display Panel (PDP), Liquid Crystal Display (LCD), and Rear Projection Display (RPD) devices that use micro-display imagers such as a digital micro-mirror device (DMD) or a liquid crystal on silicon (LCOS) device. The cost and brightness performance of the latter display technology is highly dependent on the efficiency of the screen system it uses. The designers of such display systems are constantly in search of more cost effective, efficient screen systems that would offer high levels of uniformity, contrast and brightness.

The function of a rear projection screen is to accept an image projected on one side (herein after referred to as the projection side of the screen) and to display this image to viewers on the opposite side (herein after referred to as the viewing side of the screen). The screen must interact with the projected image; hence the physical and optical properties of the screen are responsible for the screen, and subsequently the entire projection system, viewing characteristics. The physical and optical properties of the rear projection screen, ultimately translate into a set of parameters that govern its performance, including brightness gain, brightness uniformity, transmission efficiency, resolution and diffused reflectance. The angular brightness of a rear projection screen is best described in terms of its brightness gain, which is the ratio of measured brightness of a screen to the brightness of an ideal Lambertian screen as a function of the viewing angle. By Lambertian, we mean that the distribution of the light transmitted by the screen would have the same brightness or luminance when viewed from any viewing angle. The brightness uniformity of a rear projection screen describes the spatial brightness uniformity across the screen and is obtained by expressing the fractional change of brightness compared with the average brightness within a specified range of viewing angles. The transmission efficiency of a rear projection screen generally expresses the screen efficiency in terms of the fraction of light that passes through the screen and more specifically in terms of the fraction of the incident light that is scattered by the screen within some specific viewing angle. The resolution of a rear projection screen is one of the most important performance parameters, as it limits the fineness of details that can be usefully projected. The resolution properties of a rear projection screen are best expressed by the modulation transfer function, which governs the contrast transfer characteristics of the screen as a function of spatial frequency. The diffuse reflectance of a rear projection screen determines its performance sensitivity to ambient light in terms of the amount of ambient light that is diffusely returned to the viewing area from the screen. The relationship between the aforementioned performance parameters of a rear projection screen and their theoretical models are described in detail in Ref [29].

In addition to the projection screen characteristics, the performance of a rear-projection display system is governed by other factors such as: (1) the type of projection, e.g., from micro-display based digital projectors, or from laser beam scanners, etc.; (2) the projection and viewing geometries, e.g., from a single or an array of projectors, the projection image maximum incident angle on the screen, the size of the screen and the size and shape of the viewing area; (3) the brightness and uniformity of the projected image; (4) the resolution and contrast of the projected image; (5) the level of ambient light at the projection side and viewing side of the screen; and (6) the viewer perception. Of particular interest to the scope of this invention are screen systems that can effectively be used in conjunction with rear projection systems that utilize an array of multiple projectors to generate the projected image such as those described in Ref [1-5] and [18]. The performance of this type of rear projection display system is strongly affected by the variations in the angle of incidence of the light rays generated from the array of multiple projectors, which would cause: (1) viewing angle dependent variations in the brightness viewed across the screen; and (2) the blending regions to have brightness that varies with the viewing angle, which would make the image blending regions become visible at some viewing angles. This is because the brightness of an image that is diffused from a rear projection screen varies as a function of both the angle of incidence that the image makes with respect to the projection screen, and the angle at which the viewer views the image on the projection screen, Ref [29]. As a result images seamlessly tiled, calibrated and blended at one viewing angle position will have visible seams when viewed from another slightly different viewing position. This type of viewing angle brightness sensitivity in tiled rear projection display systems cannot be overcome solely by the edge blending and calibration techniques described in prior art Ref [19]-[27].

In its most basic form, a rear projection display screen would be transmissive and may include a light scattering element, or diffuser. Numerous variations of light scattering elements have been developed, including volume scatterers, surface scatterers, holographic diffusers, beads, lenticular elements and the like. While a diffuser can serve the basic function of a projection screen, additional features are often required in selected applications. For example, structures that suppress the reflection and transmittance of ambient light are often incorporated into projection screens. Controlled scattering angles have also been used to maximize the luminance (brightness) of the viewable light within a range of viewing angles. Uniformity enhancing mechanisms such as Fresnel lenses have also been placed behind or incorporated into the back of rear projection screens.

An illustration of a prior art rear projection system is shown in FIG. 1A and FIG. 1B. As shown, a projector 10 projects an image on the projection side of a screen assembly 12 which is comprised of a Fresnel lens collimation screen 13 and a projection screen 14. The image from the projector 10 is focused in the proximity of the projection screen 14. Before the light reaches projection screen 14, the light rays are redirected (collimated) by Fresnel lens collimation screen 13 to impinge on the projection screen 14 at substantially a normal angle of incidence. As shown in FIG. 1B, the projection screen 14 may be a dual lenticular structure having a rear and front lenticular surface 15 and 16, respectively. The rear lenticular surface 15 approximately focuses the light onto the front lenticular surface 16, in the region between black stripes 18 thus allowing the projected light 19 focused by the lenticular structure 15 to exit the projection screen 14 towards the viewer. Black stripes 18 absorb a substantial portion of the incident ambient light, thereby increasing the contrast of the screen. To complete the screen and control the effective scattering profile, diffusion stripes 17 are incorporated into or onto the screen regions between the black stripes 18. In the prior art example illustrated in FIG. 1B, the additional diffusion stripes determine the degree of scattering in the vertical axis along the direction of the lenticular surfaces 15 and 16. The two lenticular surfaces 15 and 16 function to provide a controlled amount of scatter only in the direction normal to the lenticular axes.

Prior art Ref. [6]-[12] disclose variations on this basic rear projection screen system approach. These schemes tend to work well for rear projection systems comprised of a single projector, however they are not effective in tiled multi projectors rear projection systems. The difficulty associated with these prior art screen technologies is their inability to overcome the viewing angle sensitivity associated with tiled rear projection display systems as explained earlier. Furthermore, many prior art screens cannot readily support the projection overlap in tiled displays that is typically used to blend the images along the seams of adjacent projectors. For example, in a prior art Ref. [2] Fresnel field lens approach, little or no overlap would be allowed because each projector must typically have a distinct Fresnel lens. The Fresnel lens simply cannot compensate for light emanating from different spaced locations. Because little or no overlap is allowed, the projected image from each projector must typically be precisely matched in size and location with the corresponding Fresnel lens to minimize the visible seams. This greatly impacts the alignment tolerance and stability of the resulting screen system. Further, it may be difficult to mask slight variations in luminance or color coming from adjacent projectors.

Toward overcoming the aforementioned viewing angle sensitivity associated with tiled rear projection display systems, prior art Ref [1] describes a rear projection pre-screen comprised of an optical faceplate made of a fibrous crystal that emulates a wave guiding effect which would collimate the light from the multiple projectors prior to being diffused, thus helping in reducing the projection system viewing angle brightness sensitivity. Pursuant to the same objective, prior art Ref [2] describes an approach in which one or more lenses are added adjacent to each projector in order to reduce the angle of incidence that the image makes with respect to the projection screen. Ref [3]-[5] aims at achieving the same objective by using a pre-screen layer that is comprised of a plurality of micro-lenses designed to partially collimate the light projected from the multiple projectors, thus reducing the angle of incidence that the projected images make with respect to the projection screen. However, the approaches described in Ref [1], [2] and [3]-[5] are only effective when each of the tiled projector's field-of-view is relatively small (less than 20°), which causes the projection depth to be large. The techniques described in Ref [1], [2] and [3]-[5] may be adequate for large venue tiled projector display systems in which the projection depth is not a parameter of critical importance. However, in the rear projection array display system described in Ref [18], the projection depth is a parameter of paramount importance and limiting the tiled projector's field-of-view to less than 20° will cause such a display system to have a large depth. In order to reduce the depth of the type of rear projection array display systems described in Ref [18] to the range of depth of other flat panel display systems, the tiled projector's field-of-view should be substantially larger than 20°. As a result the techniques described in prior art Ref [1], [2] and [3]-[5] for overcoming viewing angle brightness sensitivity in tiled rear projection display systems cannot be effectively used in conjunction with the rear projection array display system such as that described in Ref [18].

An objective of this invention is, therefore, to demonstrate a rear projection screen system that can effectively address the viewing angle brightness sensitivity associated with tiled rear projection display systems in particular those designed to achieve small projection depth. Achieving such an objective would have a substantial commercial value, as it would enable low form-factor and compact packaging of tiled rear-projection display systems.

REFERENCES CITED

US Patent Documents
  [1] U.S. Pat. No. 6,833,951 B2, Kolosowsky, Dec. 21, 2004
  [2] U.S. Pat. No. 6,377,306 B1, Johnson et al, Apr. 23, 2002
  [3] U.S. Pat. No. 6,278,546 B1, Dubin et al, Aug. 21, 2001
  [4] U.S. Pat. No. 6,469,830 B1, Dubin et al, Oct. 22, 2002
  [5] U.S. Pat. No. 6,942,959 B2, Dubin et al, Sep. 13, 2005
  [6] U.S. Pat. No. 6,151,162, Van De Ven, Nov. 21, 2000
  [7] U.S. Pat. No. 6,829,086 B1, Gibilini, Dec. 7, 2004
  [8] U.S. Pat. No. 6,816,306 B2, Freese et al, Nov. 9, 2004
  [9] U.S. Pat. No. 6,829,087 B2, Freese et al, Dec. 9, 2004
  [10] U.S. Pat. No. 5,870,224, Saitoh et al, February 1999
  [11] U.S. Pat. No. 6,597,502 B2, Takahashi et al, Jul. 22, 2003
  [12] U.S. Pat. No. 6,624,934 B1, Moshrefzdeh et al, Sep. 23, 2003
  [13] U.S. Pat. No. 6,970,288 B2, Ebina et al, Nov. 29, 2005
  [14] U.S. Pat. No. 6,700,703 B2, Funazaki et al, Mar. 2, 2004
  [15] U.S. Pat. No. 5,609,939, Peterson et al, Mar. 11, 1997
  [16] U.S. Pat. No. 5,563,738, Vance, Oct. 8, 1996
  [17] U.S. Pat. No. 6,869,195 B2, Hannington, Mar. 22, 2005
  [18] U.S. patent application Ser. No. 11/112,366, El-Ghoroury, Apr. 22, 2005
  [19] U.S. Pat. No. 6,733,138 B2, Raskar, May 11, 2004
  [20] U.S. Pat. No. 6,456,339 B1, Surati et al, Sep. 24, 2002
  [21] U.S. Pat. No. 6,755,537 B1, Raskar et al, Jun. 29, 2004
  [22] U.S. Pat. No. 6,558,006 B2, Ioka, May 6, 2003
  [23] U.S. Pat. No. 6,219,099 B1, Johnson et al, Apr. 17, 2001
  [24] U.S. Pat. No. 6,310,650 B1, Johnson et al, Oct. 30, 2001
  [25] U.S. Pat. No. 6,525,772 B2, Johnson et al, Feb. 25, 2003
  [26] U.S. Pat. No. 6,864,921 B2, Kaneda et al, Mar. 8, 2005
  [27] U.S. Pat. No. 6,695,451 B1, Yamasaki et al, Feb. 24, 2004
  [28] U.S. Pat. No. 6,967,779 B2, Fadel et al, Nov. 22, 2005

Other Documents
  [29] R. Bruce Herrick, "Rear Projection Screens: a Theoretical Analysis", Applied Optics, Vol. 7, No. 5, p. 763-771, May 1968.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE PREFERRED EMBODIMENTS

References in the following detailed description of the present invention to "one embodiment" or "an embodiment" means that a particular feature, structure, or characteristic described in connection with the embodiment is included in at least one embodiment of the invention. The appearances of the phrase "in one embodiment" in various places in this detailed description are not necessarily all referring to the same embodiment.

A microstructure based screen system for use in tiled rear projection display systems is described herein. In the following description, for the purpose of explanation, numerous specific details are set forth in order to provide a thorough understanding of the invention. It will be apparent, however, to one skilled in the art that the invention can be practiced with different specific details. In other instances, screen structures are shown in isometric or cross-sectional views in order to avoid obscuring the invention.

Figures 1A, 1B:
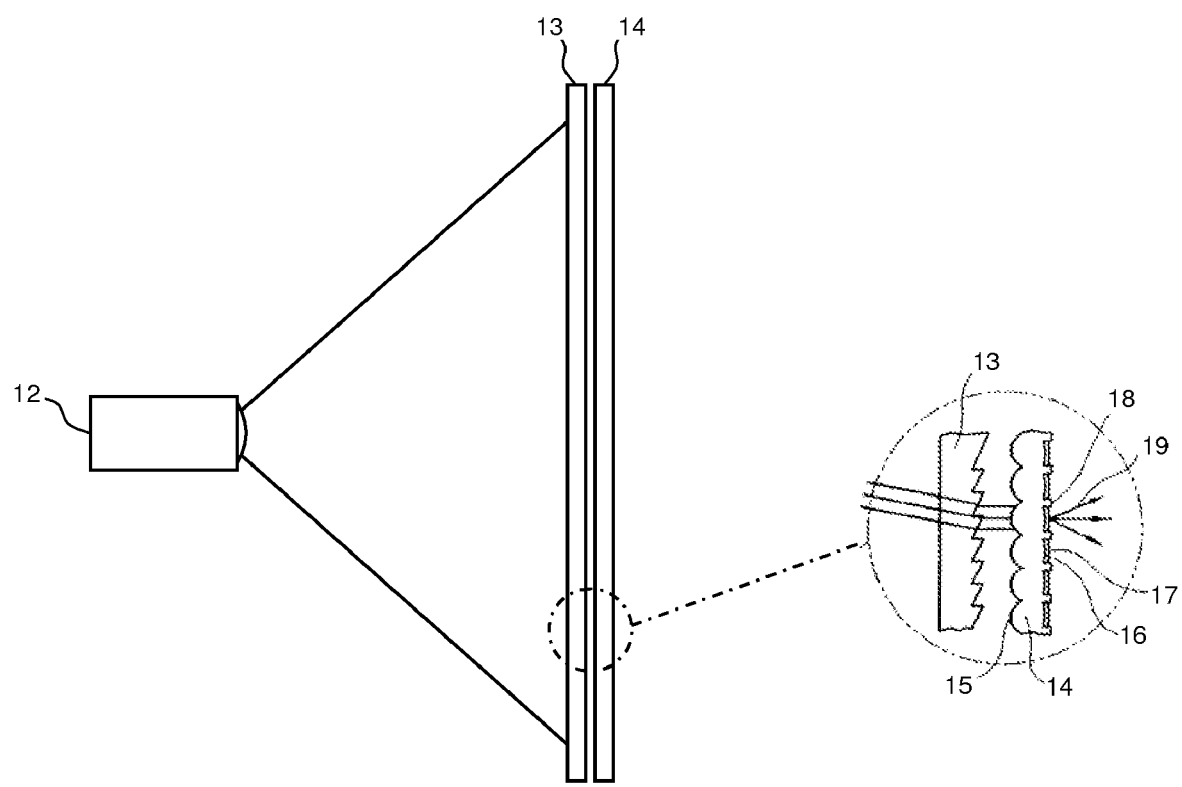
FIG. 1A illustrates a prior art rear projection screen system.
FIG. 1B illustrates an enlarged cross-sectional view of the screen system of FIG. 1A.
Figures 2A, 2B:
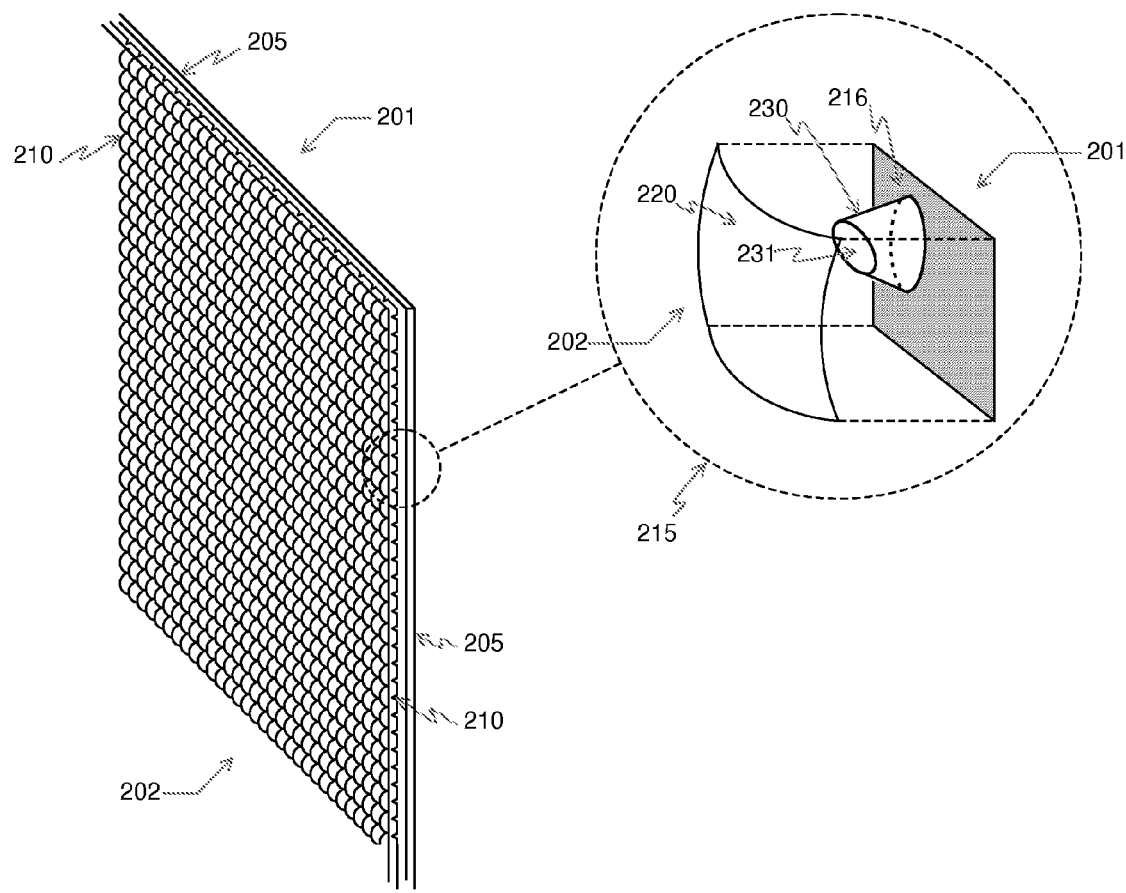
FIG. 2A illustrates one embodiment of the Micro-lens Screen System on this invention.
FIG. 2B illustrates an enlarged isometric sectional view of the screen system of FIG. 2A.

One embodiment of the tiled rear projection display screen system described herein, referred to as "Micro-lens Screen System", is illustrated in FIG. 2A and FIG. 2B. It should be appreciated that the drawings of FIG. 2A and FIG. 2B are merely a representation of the basic structure of the Micro-lens Screen System of this invention whose purpose is to facilitate explaining the operation and performance characteristics of the screen system of this invention. FIGS. 2A and 2B illustrate one of the embodiments of the Micro-lens Screen System 200 of this invention. As illustrated in FIG. 2A, the Micro-lens Screen System 200 is comprised of at least one diffusion screen 205 that faces the viewing side 201 of the Micro-lens Screen System 200 and one Collimation Screen 210 that faces the projection side 202 of the Micro-lens Screen System 200. The diffusion screen 205 would typically be a conventional diffuser, being either a volume diffuser, surface diffuser, holographic diffuser, beads or the like. The Collimation Screen 210 of the Micro-lens Screen System 200 is comprised of a plurality of micro-micro-elements 215 whose structure is illustrated in FIG. 2B. Collectively the micro-micro-elements 215 comprising the Collimation Screen 210 would cause the surface of its projection side 202 to be comprised of an array of micro-lenses and the surface of its viewing side 201 to be comprised of an array of micro-cones. The Collimation Screen 210 would typically be molded from a clear plastic dielectric material such as acrylic, polycarbonate or the like, using a dual sided mold having its first side manufactured to mold the micro-cones surface of viewing side 201 and its second side manufactured to mold the array of micro-lenses surface of the projection side 201. Depending on the overall display system design requirements, the Micro-lens Screen System 200 can either be planer or curved along at least one of its axes.

Figure 3:
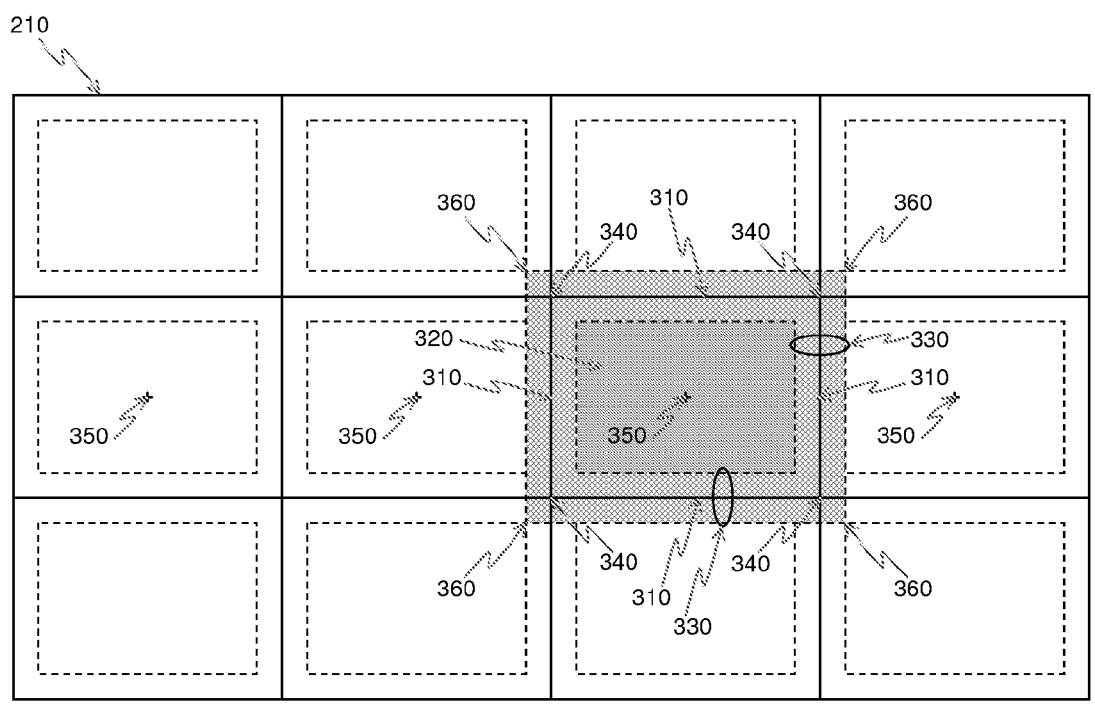
FIG. 3 illustrates the collimation regions of the screen systems of FIG. 2A and FIG. 8A.

In order to achieve the required level of brightness and color uniformity across the composite image displayed by a tiled projection display system, it is typical to partially overlap the sub-images projected by the plurality of projectors used. The areas where the projected sub-images overlap are used to blend the projected sub-images into a uniform composite image. The Collimation Screen 210 of the Micro-lens Screen System 200 of this invention when used in tiled rear projection display systems would be comprised of multiple identical sections 310, hereinafter referred to as the sub-image sections, as illustrated in FIG. 3. The number of the sub-image sections 310 of the Collimation Screen 210 would equal the number of projectors comprising the tiled rear projection display system. Referring to FIG. 3, the interior region 320 of each sub-image section 310 of the Collimation Screen 210 would collimate the sub-image projected from the on-axis tiled projector while its outer region 330 would collimate the sub-image projected by that projector as well as the overlapping portions of the sub-images projected by adjacent projectors. Hereinafter the region 330 (cross shaded region in FIG. 3) of each sub-image section 310 of the Collimation Screen 210 will be referred to as the sub-image overlap (blending) region.

Figure 2C:
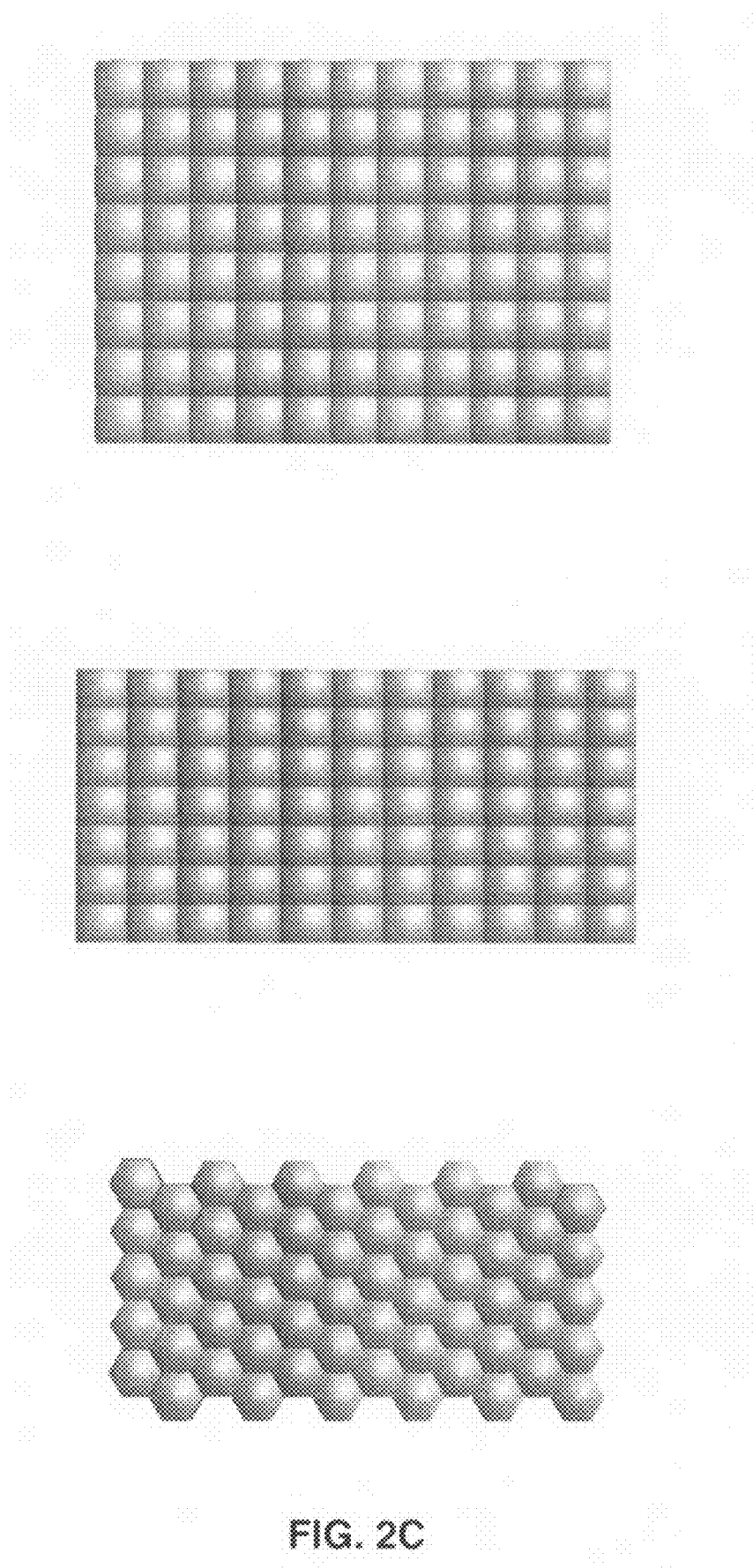
FIG. 2C illustrates the base cross section of the micro-lens element of FIG. 2B.

Referring to FIG. 2B, the surface 220 of the micro-micro-element 215 facing the projection side 202 is a curved lens surface that typically is either spherical, aspherical or ellipsoidal and has either a square, rectangular or hexagonal base cross section as illustrated in FIG. 2C. As illustrated in FIG. 2B, the surface of the micro-micro-element 215 facing the viewing side 201 is comprised of the flat surface 216 that contains the micro-cone structure (depressions) 230. As illustrated in FIG. 2B, the portion of the flat surface 216 other than the micro-cone structure 230 would be coated with light blocking black (non-reflective) coating 216 making the micro-cone structure 230 be the only optically clear portion out of which light would be transmitted through the micromicro-element 215 toward the viewing side 201. The black coating 216 of the surface area in between the micro-cone depressions 230 would enable the Micro-lens Screen System 200 to have ambient light rejection capability that is proportional to the ratio of the difference between the areas of the micro-lens 220 base and the micro-cone 230 base, to the area of the micro-lens 220 base. Depending on the design tolerance margin allowances, this ratio can be made to allow the Micro-lens Screen System 200 of this invention to have ambient light rejection capability that could be greater than 65%.

Thus the black coating surrounding the bases of the micro-cones is the "ambient rejection means" of the present invention screen system. As the name implies, the ambient rejection means, being the black coating between the bases of the micro-cones, prevents ambient light from crossing over to the projection side from the viewing side of the screen. Accordingly the ambient light rejection of the present invention screen system is proportional to the ratio of the area of the black coating surrounding the base of a micro-cone 230 to the area of a base of a micro-lens 220. Consequently, the ambient light rejection of the screen system is proportional to the ratio area of the black coating to the total area of the screen.

When such ambient light rejection means are not included in the screen system, ambient light will cross over from the viewing side to the projection side of the screen, thus causing degradation in the projection contrast. The simplest form of ambient light rejection is adding a layer of tenting on the viewing side of the screen system—which would reject ambient light at the expense of reducing the screen system transmittance efficiency (the efficiency of the screen system in transferring light from the projection to the viewing side). What is unique about the present screen system is that the black coating surrounding the bases of the micro-cones would reject (absorb) the ambient light that may fall on the viewing side of the screen system from any direction while leaving only the minimal area required (being the bases of the micro-cones) to transmit the projected light through to the viewing side—thus not requiring any tenting and not degrading the screen system's overall transmittance efficiency.

Thus a "65% ambient light rejection capability" means that the screen is capable of rejecting 65% of the ambient light that might fall on the viewing side of the screen system without degrading the overall transmittance efficiency of the screen system. In comparison, if one seeks to achieve this level of ambient light rejection (65%) by tenting the screen viewing side, the added tenting would also reduce the overall transmittance efficiency of the screen system from the projection side to the viewing side by 65%.

As illustrated in FIG. 2B, the bottom of the micro-cone depression 230 includes an exit surface 231 through which the light ray bundle that entered the micro-micro-element 215 through the curved lens surface 220 would be refracted as it exits the micro-micro-element 215. The exit surface 231 can either be a planer or curved (such as spherical, aspherical or ellipsoidal) surface. The center of the exit surface 231 is defined as the exit point of the central (principal) ray 233 of the light ray bundle that entered the micro-micro-element 215 through the center of the curved lens surface (micro-lens) 220. The center of the micro-cone 230 exit surface 231 as well as its inclination angle relative to the screen surface would be determined such that the principal ray 233 that entered the micro-micro-element 215 through the center of the curved lens surface (micro-lens) 220 would be collimated, meaning becoming substantially perpendicular to the surface of the screen, as it refracts through the exit surface 231.

Referring to FIG. 2B, the projection side surface 202 of the collimation screen is the surface of the micro-lenses, and the micro-cones are indentations on the viewing side 201 of the collimation screen, each in the form of a micro-cone. Light that falls on a micro-lens 220 is focused within the dielectric material of the collimation screen into a spot that strikes the exit surface 231 of the micro-cone and then refracts as it goes from the dielectric material of the screen to the air and gets collimated. Because of the focusing effect of the micro-lens 220, the size of the light spot formed by the micro-lens is much smaller than the size of the micro-lens itself and sizing the micro-cone and its exit surface to refract the smaller size of the spot formed by the micro-lens would leave the area surrounding the base of the micro-cone optically inactive, and thus that area can be coated with light absorbing black coating. That light absorbing black coating prevents ambient light from crossing over from the viewing side to the projection side of the screen. Thus the combination of the micro-lens, the micro-cone and the black coating surrounding its base would allow screens in accordance with the present invention to effectively collimate the light projected on its projection side and have maximum transmittance in transferring the light it collimates to its viewing side while having minimum transmittance of the ambient light from the viewing side to the projection side.

Figure 4A:
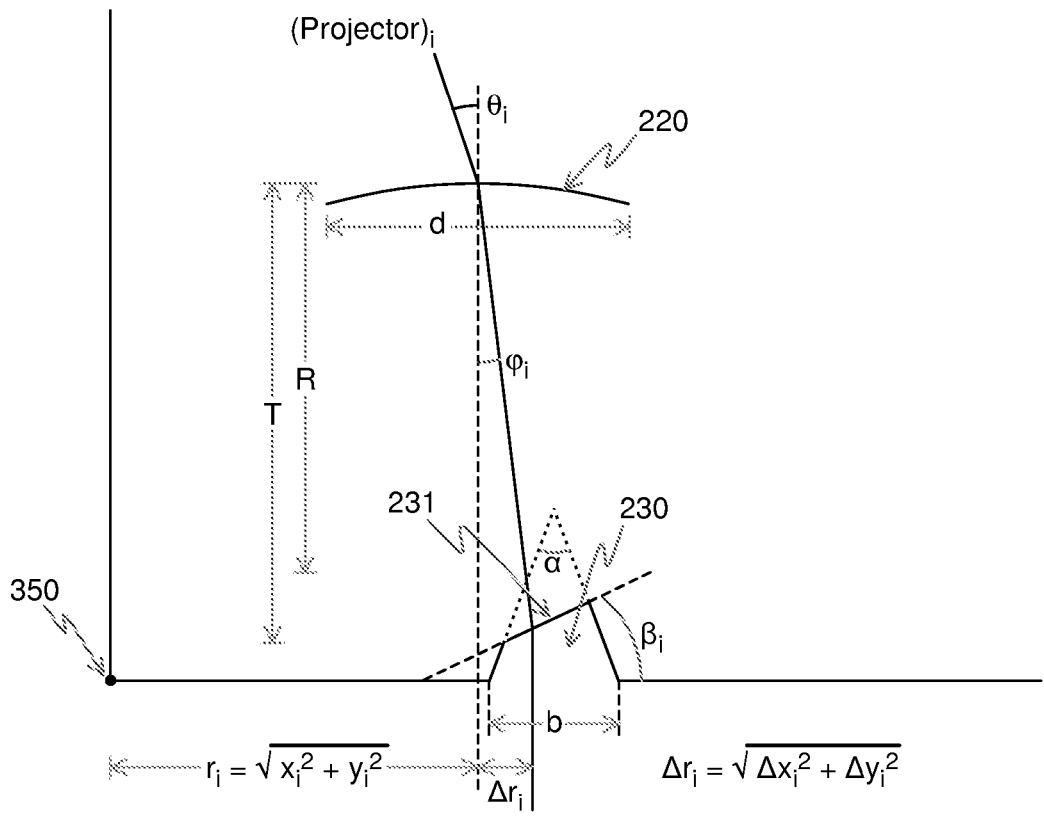
FIG. 4A illustrates a cross-sectional view of the micro-micro-element of FIG. 2B along the meridian plan containing the incident ray.
Figure 4B:
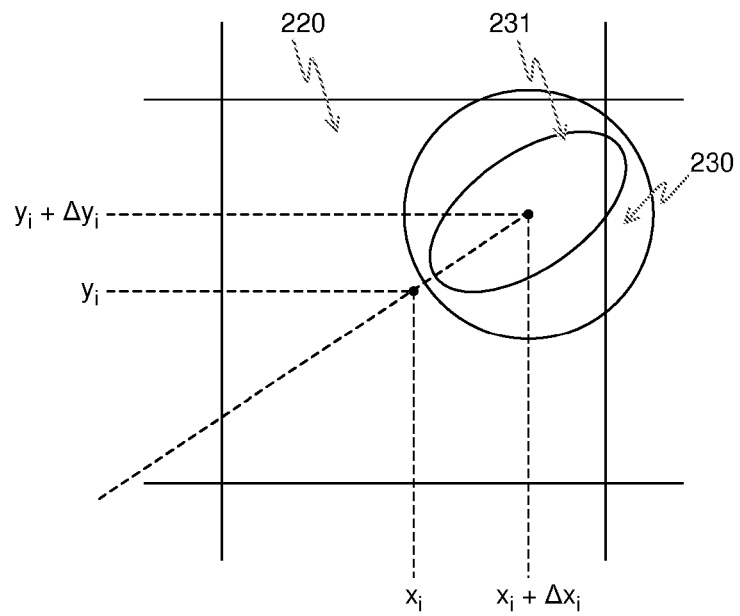
FIG. 4B illustrates a horizontal cross-sectional view of the micro-micro-element of FIG. 2B.

FIG. 4A and FIG. 4B illustrate the salient design parameters of the Collimation Screen 210. FIG. 4A illustrates a cross section of the micro-micro-element 215 along the meridian plane of the incident ray. This could be a vertical cross section ($X_1=0$), a horizontal cross section ($Y_1=0$), or a section taken at some angle there between as in FIG. 4B, which is a face view of the micro-micro-element 215 angularly displaced in both the horizontal and the vertical directions from the center 350 of the sub-image area 310.

Referring to FIG. 4A and FIG. 4B, the salient design parameters of the Collimation Screen 210 include the following: (1) its thickness, which is denoted as "T"; (2) the curvature radius of the micro-lens 220, which is denoted as "R"; (3) the dimensions of the base of the micro-lens 220 which is denoted as "d"; (4) the position of the center of the micro-lens 220 relative to the center of the sub-image section 310, which is denoted as "$(x_i, y_i)$"; (5) the position of the center of the exit surface 231 in reference to the center of the micro-lens 220, which is denoted as $(\Delta x_i, \Delta y_i)$; (6) the orientation of the exit surface 231 in reference to the plane perpendicular to the axis of the micro-micro-element 215, which is denoted as "$\beta_i$"; (7) the diameter of the base of the micro-cone 230, which is denoted as "b"; and (8) the full apex angle of the micro-cone 230, which is denoted as "$\alpha$".

As it traverses the Collimation Screen 210 from the projection side 202 to the viewing side 201, the light ray bundle incident on each micro-lens 220 is completely specified by its principal (or central) ray and its two focal lines known to a person skilled in the art as "the primary (tangential) focal line" and "the secondary (sagittal) focal line". The image formed by each micro-lens 220 of the light ray bundle incident on it would typically vary in size within the distance spanning its primary and secondary focal lines and would attain a minimal value, known to a person skilled in the art as "minimum blur (spot) size", half way in between its primary and its secondary focal lines, which is known as "the minimum blur (spot) distance". The thickness T of the Collimation Screen 210 is selected in conjunction with the curvature of the micro-lens such that the minimal blur (spot) size would occur at each of the sub-image corners 340 illustrated in FIG. 3. Based on this criterion, the thickness T of the Collimation Screen 210 would be specified by;

$$T = L_m \cos \phi_c \qquad (1)$$

Where $L_m$ and $\phi_c$ denote the minimum blur (spot) distance and the angle of refraction of the principal ray incident; respectively, at the micro-lens 220 located at the sub-image corners 340. The value of the refraction angle $\phi_c$ is related to the value of the projection angle $\theta_c$ at the micro-lens 220 located at the sub-image corners 340 by Snell's law of refraction;

$$\phi_c = \text{Sin}^{-1}([\text{Sin } \theta_c]/n) \qquad (2)$$

where n denotes the index of refraction of the dielectric material from which the Collimation Screen 210 is molded (manufactured).

As mentioned earlier, the minimum blur (spot) distance $L_m$ would be half way in between the primary and the secondary focal lines of the micro-lens 220 located at the sub-image corners 340; and subsequently would be given by;

$$L_m = (L_p + L_s)/2 \qquad (3)$$

Where $L_p$ and $L_s$ denote the distances to the primary and secondary focal lines; respectively, of the micro-lens 220 located at the sub-image corners 340, which are given by;

$$L_p = (n \text{ Cos}^2 \phi_c)/P$$

$$L_s = n/P \qquad (4)$$

Where P denotes oblique power of the micro-lens 220, which is given by:

$$P = (n \text{ Cos } \phi_c - \text{Cos } \theta_c)/R \qquad (5)$$

The value of $\theta_c$ would be determined by the value of the field of view or throw ratio of each of the tiled projectors, which in turn would be selected based on the value of the projection depth the tiled rear projection display system is required to achieve. The value of the curvature radius R of the micro-lens 220 would be determined by the moldable value of its sag, which is denoted by S and for a spherical micro-lens (as an example) is given by;

$$S = R(1 - \sqrt{1 - (D/2KR)^2}) \qquad (6)$$

Where K=(D/d) is the ratio between the dimension of the projected pixel, which is denoted by "D", and the dimension of the base of the micro-lens 220, which is denoted by "d". In order to satisfy Nyquist spatial sampling criterion and to avoid Moiré effects, the value of K would typically be selected as a none-integer value that is greater than 2. Thus the area of a projected pixel should be at least four times larger than the area of the micro-lens base. Hence each of the micro-lenses of the collimation screen actually acts on a "sub-pixel", meaning that each projected pixel is sampled by the micro-lenses into "sub-pixels" with each such sub-pixel being acted upon by one micro-element (combination of one micro-lens and one micro-cone) of the screen.

Figure 5:
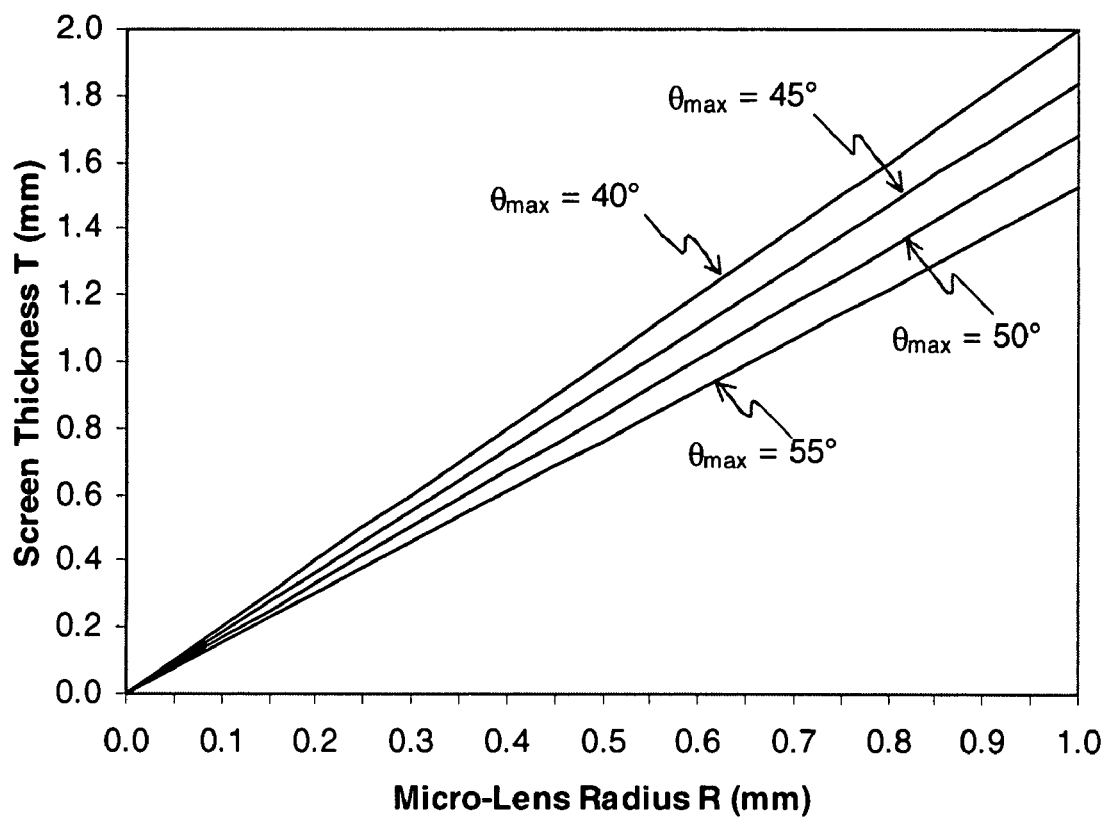
FIG. 5 illustrates the relationship between the Collimation Screen of the screen system of FIG. 2A and the radius of curvature of its constituent micro-lens.
Figure 6:
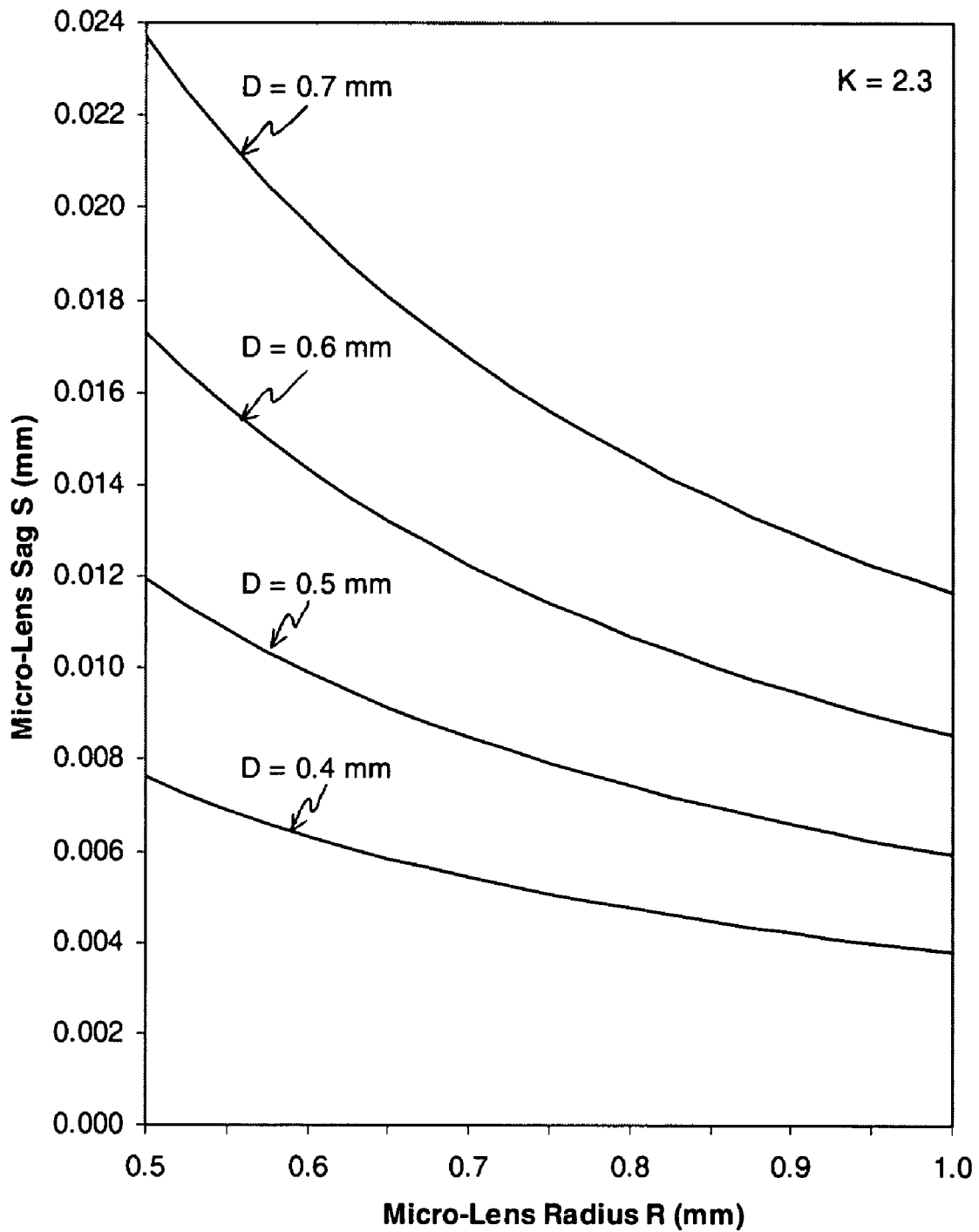
FIG. 6 illustrates the relationship between the radius of curvature and the sag of the micro-lens of the Collimation Screen of the screen system of FIG. 2A.

With the values of $\theta_c$ and R selected as explained above, the thickness T of the Collimation Screen 210 would be specified based on equations (1)-(5) above. FIG. 5 illustrates the relationship between the thickness T of the Collimation Screen 210 and the radius of curvature R of the micro-lens 220 for various values of $\theta_c$ and a value of n=1.55 based on equations (1)-(5). As illustrated in FIG. 5, the thickness T of the Collimation Screen 210 increases linearly with the radius of curvature R of the micro-lens 220 with a slope that decreases with the increase in value of $\theta_c$ (which as explained earlier would be determined by the value of the field of view or throw ratio of the tiled projectors). In order to insure the structural stability of the Collimation Screen 210, it is typically desirable to make its thickness T as large as possible, which as illustrated in FIG. 5 would imply selecting the largest value possible for the radius of curvature R of the micro-lens 220. FIG. 6, which illustrates the relationship between the radius of curvature R micro-lens 220 and its sag S (the distance from the highest point on the screen surface to the lowest point on the screen surface) based on equation (6), shows that for a specified projection pixel size as determined be its dimension D (also known to a person skilled in the arts as "pixel pitch"), the sag of the micro-lens 220 decreases with the increase in the value of the radius of curvature R of the micro-lens 220. As a result the largest possible value for the radius of curvature R of the micro-lens 220 would be determined by the moldable value of its sag S, which as indicated by equation (6) would be determined based on the size of the projected pixel as determined by its dimension D.

Not withstanding the above discussion which illustrated the design specifications of the Screen System 200 when the micro-lens 220 is a spherical surface and having the same curvature radius R across the sub-image area 310, in order to enhance the collimation performance of the Screen System 200 it would be possible to extend the design specifications outlined above for the case when the curvature radius R of the micro-lens 220 varies gradually from the center to the edge of the sub-image 310. In this case the micro-lens 220 curvature radius variation as a function of its position relative to the center 350 of the sub-image area 310 would be incorporated in equations (1) through (6) to the extent required to specify the remainder of the Screen system 200 design parameters.

As illustrated in FIG. 4B, the center of the exit surface 231 of the micro-cone 230 would be offset from the center of its corresponding micro-lens 220 by a distance $(\Delta x_i, \Delta y_i)$ along the x and y axes centered at the center 350 of the sub-image 310, which is specified by:

$$\Delta x_i = T \text{ Sin } \theta_i(x) / \sqrt{n^2 - \text{Sin}^2 \theta_i(x)} \qquad (7a)$$

$$\Delta y_i = T \text{ Sin } \theta_i(y) / \sqrt{n^2 - \text{Sin}^2 \theta_i(y)} \qquad (7b)$$

Where $\theta_i(x)$ and $\theta_i(y)$ denote the x-component and y-component; respectively, of the projection angle of incidence $\theta_i$ at the center of the corresponding micro-lens 220, which are given by:

$$\theta_i(x) = \tan^{-1}\{x_i \tan \theta_i / \sqrt{x_i^2 + y_i^2}\} \qquad (7c)$$

$$\theta_i(y) = \tan^{-1}\{y_i \tan \theta_i / \sqrt{x_i^2 + y_i^2}\} \qquad (7d).$$

Based on equations (7) above, each of the sub-image sections 310 comprising the viewing side 201 of the Collimation Screen 210 would be comprised of an array of micro-cones 230 arranged on a grid which is determined by: (1) the grid formed by the array of micro-lens 220 comprising the projection side 202 of the Collimation Screen 210; (2) the projection angles of incidence on the array of micro-lenses 220; and (3) the selected thickness of the Collimation Screen 210. As indicated by equations (7), the array of micro-cones 230 would be comprised of rows that are parallel to the x-axis at the center of the sub-image section 310 and columns that are parallel to the y-axis at the center of the sub-image section 310, with these rows and columns of micro-cones 230 being offset from the set of rows and columns defined by the array of micro-lens 220 by the values $(\Delta x_i, \Delta y_i)$ which gradually increase from the center to the edge of the sub-image section 310. The arrangement of the array of micro-cones 230 into rows and columns that are parallel to the axis of the respective sub-image section 310 as specified by equations (7) allows the sub-image sections 310 to be conjoined along the boundaries of the sub-image sections 310 and abutted together to form the composite projection array Collimation Screen 210 illustrated in FIG. 3.

None withstanding the above discussion which illustrated the design specifications of the Screen System 200 when the micro-lens 220 is a spherical surface, a person skilled in the art would be able to extend the design specifications for the case when the micro-lens 220 is not spherical, such as aspherical or ellipsoidal with curvature characteristics that either are the same or vary from the center to the edge of the sub-image area 310.

Unlike the prior art, the location of the refracting surface, being the exit surface 231 of the micro-cone 230 for the case of this invention, is not restricted to be centered or even within the footprint of the corresponding micro-lens 220, a feature that allows the Collimation Screen 210 of this invention to be able to collimate a much wider range of values of the projection angle of incidence, which in turn enables rear projection systems to have a much thinner depth.

With the micro-cone 230 positioned along the refracted path of the principal ray 233 of its corresponding micro-lens 220 as specified by equations (7) and illustrated in FIG. 4A, the inclination of its exit surface 231 is specified such that the principal ray 233 of its corresponding micro-lens 220 would be collimated as it exits the dielectric material of the Collimation Screen 210, meaning becoming substantially perpendicular to the surface of the screen, as it refracts through the exit surface 231. Referring to FIG. 4A, which illustrates a cross section of the Collimation Screen 210 along the meridian plane containing the principal ray incident on the center of the micro-lens 220, the orientation of the exit surface 231 of the micro-cone 230 that would satisfy the aforementioned collimation criterion specified in terms of its inclination angle $\beta_i$, would be given by;

$$\beta_i = \mathrm{Tan}^{-1}\{\mathrm{Sin}\,\theta_i / \sqrt{n^2 - \mathrm{Sin}^2\theta_i - 1}\} \tag{8}$$

Unlike the prior art, the inclination of the exit surface 231 of the micro-cone 230 is not restricted to be always parallel to the plane of its corresponding micro-lens 220, in fact as indicated by equation (8) the inclination of the exit surface 231 would vary from being parallel to the plane of the corresponding micro-lens 220 at the center 350 of the sub-image 310 to being gradually inclined with an angle that will collimate the principal ray of each micro-lens 220 projected on the screen. This feature enables the Collimation Screen 210 of this invention to be able to collimate a much wider range of values of the projection angle of incidence, which in turn enables rear projection systems to have a much thinner depth.

None withstanding the above discussion which illustrated the design specifications of the Screen System 200 when the micro-cone 230 exit surface 231 is a planer surface, a person skilled in the art would be able to extend the design specifications for the case when the micro-cone 230 exit surface 231 has a surface other than a planar surface, such as a spherical, aspherical or ellipsoidal shape.

Figure 7A:
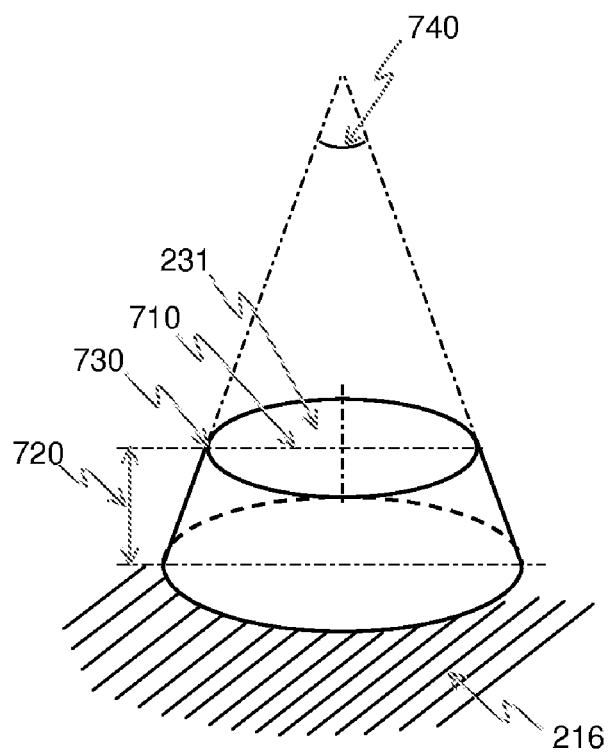
FIG. 7A illustrates an isometric view of the micro-cone structure of the Collimation Screen of the screen system of FIG. 2A at the center of a projected sub-image.
Figure 7B:
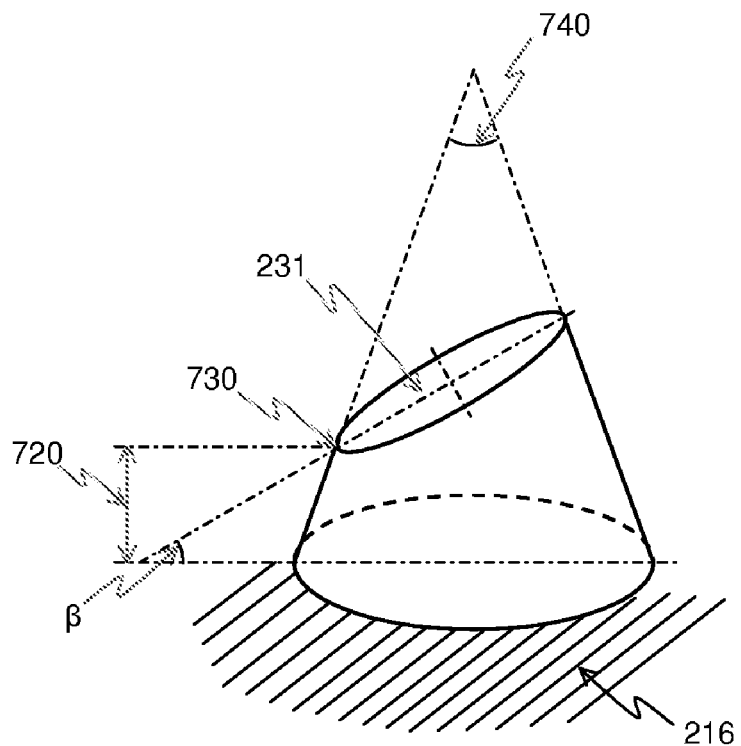
FIG. 7B illustrates an isometric view of the micro-cone structure of the Collimation Screen of the screen system of FIG. 2A midway between the center and the corner of a projected sub-image.
Figure 7C:
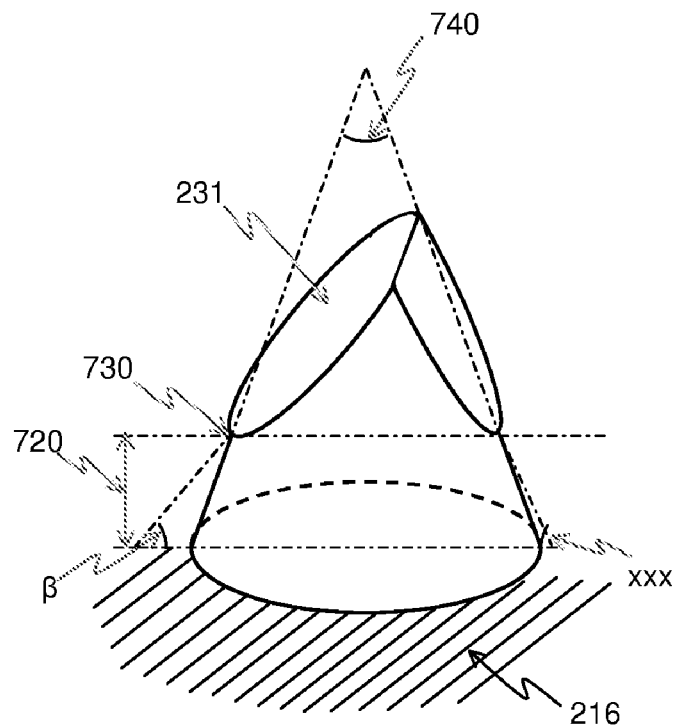
FIG. 7C illustrates an isometric view of the micro-cone structure of the Collimation Screen of the screen system of FIG. 2A within the blending region where two projectors' sub-images overlap.
Figure 7D:
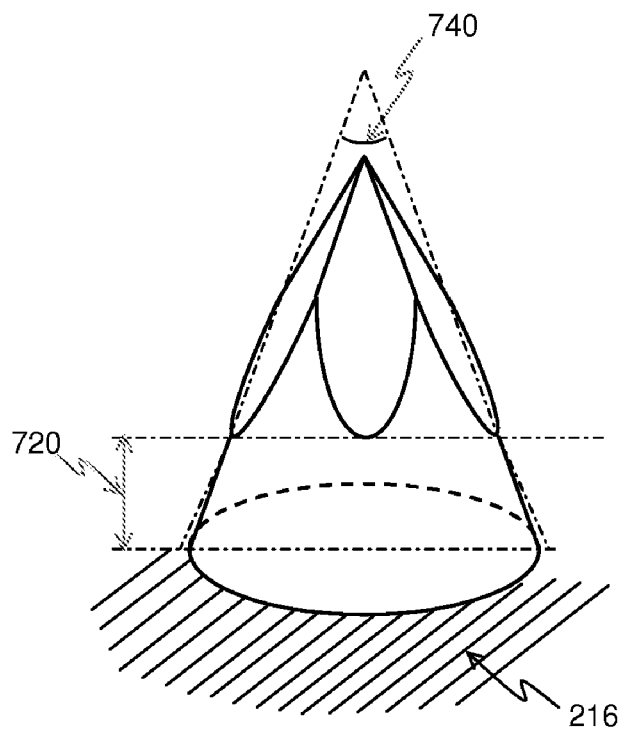
FIG. 7D illustrates an isometric view of the micro-cone structure of the Collimation Screen of the screen system of FIG. 2A within the blending region where four projectors' sub-images overlap.

FIG. 7A through FIG. 7D show isometric view illustrations of the structure of the micro-cone 230 of the Collimation Screen 210 at various locations within its sub-image areas 310. FIG. 7A illustrates the micro-cone structure 230 at the center 350 of the sub-image areas 310, FIG. 7B illustrates the micro-cone 230 structure midway between the center 350 and the corner 340 of the sub-image areas 310, and FIGS. 7C & D illustrate the micro-cone structure 230 within the sub-image overlap (blending) region 330 of the sub-image area 310, whereby FIG. 7C illustrates the micro-cone structure 230 within the overlap (blending) region 330 where two projectors overlap and FIG. 7D illustrates the micro-cone structure 230 within the overlap (blending) region 330 where four projectors overlap. Based on equation (8), the exit surface 231 of the micro-cone 230 located at the center 350 of the sub-image section 310 would be parallel to the plane of its corresponding micro-lens 220 which would be located at the center 350 of the sub-image area 310. As illustrated in FIG. 7A the exit surface 231 in this case would be have a circular shape having a diameter 710 which is denoted as "$e_o$" and is given by;

$$e_o = d(L_o - T)/(L_o - S) \tag{9}$$

Where S denotes the sag of the micro-lens 220 and $L_o$ denotes its focal distance, which is given by;

$$L_o = R(n/n-1) \tag{10}$$

As illustrated in FIG. 7A, the exit surface 231 would be located at a height 720 from the surface of the viewing side 201 of the Collimation Screen 210. The height 720 is allocated to allow for surface level separation between the optically clear exit surface 231 of micro-cones 230 located at the center 350 of the sub-image section 310 and the light blocking surface of the ambient light rejection coating 216 to facilitate the application of the black light blocking coating to the light blocking surface between micro-cones without inadvertent application of the black light blocking coating to any of the exit parts of the surfaces 231.

As illustrated in FIG. 7B, within the interior region 320 of each sub-image section 310 of the Collimation screen 210, each micro-cone 230 would have one exit surface 231 which would be inclined by an angle $\beta_i$, which is given by equation (8), in the meridian plane containing the principal ray incident on the center of its corresponding micro-lens 220. The exit surface 231 illustrated in FIG. 7B would have its plane perpendicular to the meridian plane containing the principal ray incident on the center of its corresponding micro-lens 220. The inclination anchor point 730 of the exit surface 231 illustrated in FIG. 7B would be located within the meridian plane containing the principal ray incident on the center of the corresponding micro-lens 220 at a height 720 from the surface of the viewing side 201 of the Collimation Screen 210. In one embodiment, the height 720 is substantially the same for all micro-cones, again to facilitate the application of the black coating, though this is not a limitation of the invention. In that regard, a typical exit surface is purposely made larger than the spot focused thereon so that the micro-cones need not be exactly located to avoid projected light loss.

As illustrated in FIG. 7B in this case the exit surface 231 would have an elliptical shape having a major axis which is denoted as "$e_i$" and is given by;

$$e_i = (e_o/2 \, \mathrm{Cos}\,\beta_i)\{1 + [\mathrm{Cos}(\beta_i + \alpha)/\mathrm{Cos}(\beta_i - \alpha)]\} \tag{11}$$

Where $\alpha$ is the full apex angle 740 of the micro-cone 230 which would be specified by;

$$\alpha = 2(\pi - \beta_{max}) \tag{12}$$

Where $\beta_{max}$ is the inclination angle of the exit surface 231 of the micro-cone 230 located at the outer corners 360 of the overlap region 330 of the sub-image section 310 of the Collimation Screen 210. $\beta_{max}$ would be specified using equation (8) with the value of the projection angle being $\theta_{max}$, which is the projection angle of incidence at the corners 360 of the overlap region 330 of the sub-image section 310 of the Collimation Screen 210.

It should be noted that the shape of the exit surface 231 would be substantially similar, but larger in area, to the shape of the blur spot generated by the micro-lens 220 since the plane of the exit surface 231 is perpendicular to the meridian plane containing the principal ray and having its major axis laying within the meridian plane and inclined by an angle $\beta_i$ given by equation (8).

As illustrated in FIG. 7C, within the overlap (blending) region 330 where the sub-images of two projectors overlap, the micro-cone 230 would have two exit surfaces 231 corresponding with the two tiled projectors illuminating the sub-image overlap region. The inclination angles of each of the two exit surfaces illustrated in FIG. 7C would be specified by equation (8) whereby the plane of each exit surface 231 would be perpendicular to the meridian plane containing the principal ray incident on the corresponding micro-lens 220 from each of the two tiled projectors.

As illustrated in FIG. 7D, within the overlap (blending) region 330 where four projectors overlap, the micro-cone 230 would have four exit surfaces 231 corresponding with the four tiled projectors illuminating the sub-image overlap region. The inclination angles of each of the four exit surfaces illustrated in FIG. 7C would be specified by equation (8) whereby the plane of each exit surface 231 would be perpendicular to the meridian plane containing the principal ray incident on the corresponding micro-lens 220 from each of the four tiled projectors.

As stated before, the exit surface offset from the center of the micro-lens increases gradually as ones moves from the center to the edge of a sub-image of the collimation screen 210. As the overlap (blending) region is reached, the exit surface could be offset several lens widths from its corresponding micro-lens (for example in one screen design, that offset is greater than three lens widths). As a result, a single micro-cone in the overlap region of two projectors would correspond with two micro-lenses and a single micro-cone in the overlap region of four projectors would correspond with four micro-lenses. Since the micro-lenses are positioned in a continuous grid pattern, their generated spots would also be located on a grid pattern that is substantially similar. When the micro-cones are placed in the positions where the spots generated by adjacent projectors (two or four) are substantially overlapping, then the exit surface inclinations in the direction of each ray generating each spot is set to the value that would collimate that ray bundle that strikes the respective exit surface.

Note that in FIG. 7C and FIG. 7D, each exit surface 231 could be offset several micro-lens widths plus or minus an odd fraction of a micro-lens width. This may be accommodated in various ways. In one embodiment, the micro-cones in the blending regions are purposely made larger than those near the center of each sub-image so that its exit surfaces are also larger to make up for this odd fractional offset. Alternatively the exit cones in the blending regions could be made taller, or both larger and taller, or the exit surfaces offset vertically (relative to the FIGS. 7C and 7D) with respect to each other in the blending region as appropriate to intercept the spot intended to be focused thereon. However it has been shown by simulation that purposely making the micro-cones in the blending regions larger than those near the center of each sub-image results in satisfactory performance in this regard.

This ability to create multiple exit surfaces 231 on each of the micro-cones 230 comprising the viewing side 201 of the Collimation Screen 210 enables it to effectively collimate the light projected on the screen from multiple projectors, a feature not shared with any of the prior art collimation screens. This feature allows the Collimation Screen 210 of this invention to have as many collimation axes as required to collimate the light projected by the array of tiled projectors.

As stated earlier, the black coating 216 of the surface area between the micro-cones 230 would enable the Micro-lens Screen System 200 to have ambient light rejection capability that is proportional to the ratio of the difference between the areas of the micro-lens 220 base and the micro-cone 230 base, to the area of the micro-lens 220 base. For example, in referring to FIG. 2B, if the cross section of the micro-lens 220 is square shaped having a side "d" and the diameter of the base of the micro-cone 230 is "b"; then the ambient light rejection of the Micro-lens Screen System 200 would be equal to $\{(d^2-\pi b^2)/d^2\}$. Depending on the design tolerance margin allowances, this ratio can be made to allow the Micro-lens Screen System 200 of this invention to have an ambient light rejection capability that could be greater than 65%. Unlike the prior art, the ambient light rejection capability of the Micro-lens Screen System 200 of this invention is not restricted to act only along one axis, thus allowing the Micro-lens Screen System 200 to effectively reject ambient light that may fall on the screen from any direction. The ability of the Screen System 200 to collimate the light projected from rows and columns of tiled projectors while simultaneously rejecting ambient light that may fall on the screen from any direction is a capability that is not shared with any prior art.

Figures 8A, 8B:
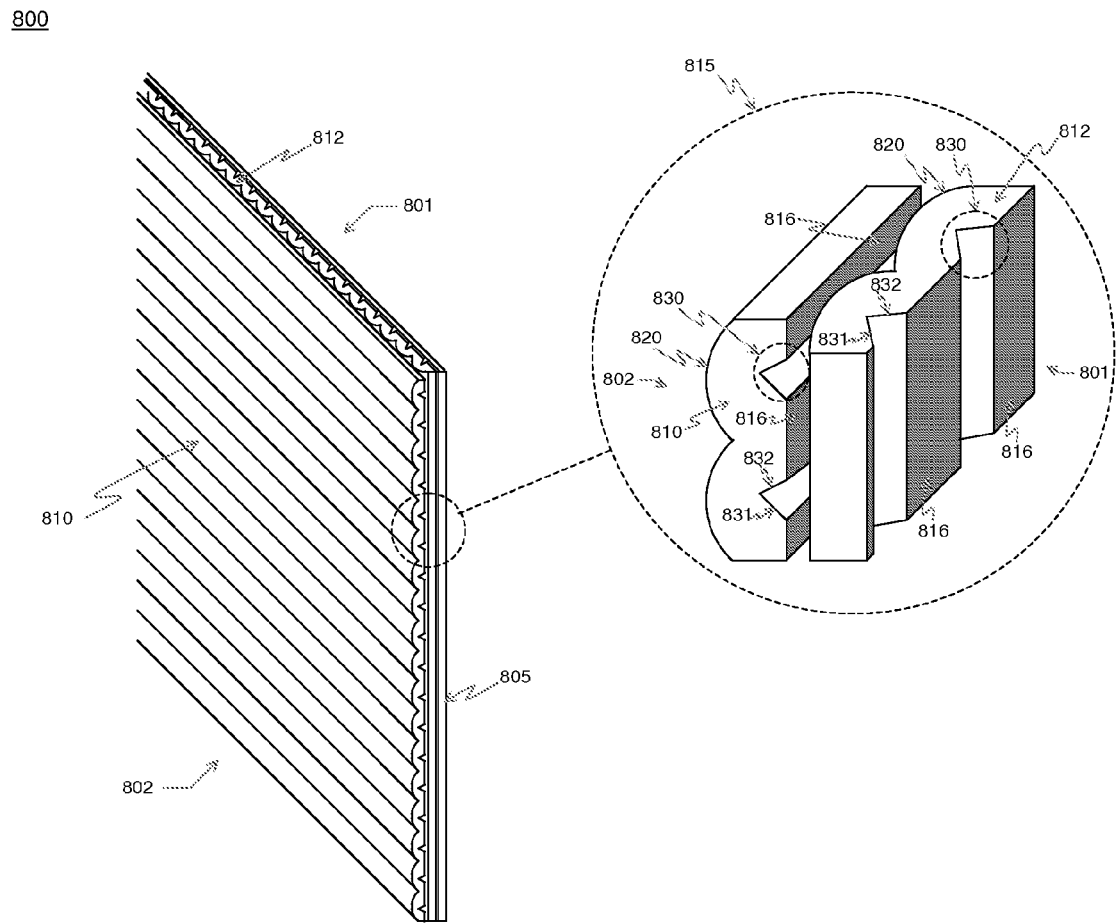
FIG. 8A illustrates the second embodiment of the Micro-lens Screen System on this invention.
FIG. 8B illustrates an enlarged isometric sectional view of the screen system of FIG. 8A.

The second embodiment of the Micro-lens Screen System of the invention described herein is illustrated in FIG. 8A and FIG. 8B. It should be appreciated that the drawings of FIG. 8A and FIG. 8B are merely a representation of the basic structure of the second embodiment of the Micro-lens Screen System of this invention whose purpose is to facilitate explaining the design, operation and performance characteristics of the screen system of this invention. As illustrated in FIG. 8A, the Micro-lens Screen System 800 is comprised of at least one diffusion screen 805 that faces the viewing side 801 of the Screen System 800 and two Collimation Screens 810 and 812 facing the projection side 802 of the Micro-lens Screen System 800. The two collimation screens would act on two orthogonal axes; meaning if the Collimation Screen 810 collimates the projected light along the horizontal axis of the Micro-lens Screen System 800, the Collimation Screen 812 would collimate the projected light along the vertical axis of the Micro-lens Screen System 800. The diffusion screen 805 of the Micro-lens Screen System 800 would typically be a conventional diffuser, being either a volume diffuser, surface diffuser, holographic diffuser, beads or the like.

Each of the Collimation Screens 810 and 812 of the Micro-lens Screen System 800 is comprised of a plurality of micro-micro-elements 815 whose structure is illustrated in FIG. 8B. Collectively the micro-micro-elements 815 comprising each of the Collimation Screens 810 and 812 would cause their surface facing the projection side 802 to be comprised of an array of cylindrical micro-lenticular lenses 820 and their surface facing viewing side 801 to be comprised of an array of micro-prisms 830 (prism shaped depressions defining two exit surfaces), both the micro-lenticular lenses and the micro-prisms being aligned along an axis that is perpendicular to the screen. Careful examination of FIG. 8B reveals that the structure of the Collimation Screens 810 and 812 can be viewed as an orthogonal decomposition of the Collimation Screen 210 along its horizontal and vertical axes—such a decomposition would create the two orthogonal layers of micro-lenticular lenses 820 on the projection side 802 of the Collimation Screens 810 and 812 and a corresponding two orthogonal layers of micro-prisms 830 on the viewing side 801 of the Collimation Screens 810 and 812.

The Collimation Screens 810 and 812 would typically be molded from a dielectric material such as acrylic, polycarbonate or the like, using a dual sided mold having its first side manufactured to mold the micro-prisms surface facing viewing side 801 and its second side manufactured to mold the array of micro-lenticular lenses surface facing projection side 802. Depending on the overall display system design requirements, the Micro-lens Screen System 800 can either be planer or curved along at least one of its axes.

Referring to FIG. 8B, the cross section of the micro-lenticular lenses 820 would typically be either circular, parabolic or elliptical. As illustrated in FIG. 8B, the surface of the micro-element 815 facing the viewing side 801 is comprised of the micro-prisms 830 separated by the flat surfaces 816. The portion of the micro-lenticular lenses 810 and 812 in an area of overlap of one micro-lenticular lens on Collimation Screen 810 and one micro-lenticular lens on Collimation Screen 812 may be considered a micro-lens equivalent to each of the micro-lenses 220 of FIG. 2B, with the overlap area itself being the base of a micro-lens. The area of the clear aperture formed by the overlap of one micro-prism on Collimation Screen 810 and one micro-prism on Collimation Screen 812 may be considered the base of a micro-prism associated with a respective base of a micro-lens.

As illustrated in FIG. 8B, the flat surfaces 816 would be coated with a light blocking black coating making the micro-prisms 830 be the only optically clear portion out of which light would be transmitted through the micro-micro-element 815 toward the viewing side 801. The black coated flat surfaces 816 between the micro-prisms 830 would enable each of the Collimation Screens 810 and 812 to have ambient light rejection capability that is proportional to the ratio of the difference between the area of the base of a micro-lens (as defined above) and the base of a micro-prism (as defined above), to the base of a micro-lens. Since both the entire bases of the micro-lenticular lenses 820 and the entire bases of the micro-prisms 830 on each Collimation Screen have one equal dimension along the axis perpendicular to the collimation axis of the screen, the black coated flat surfaces 816 between the micro-prisms 830 would enable each of the two Collimation Screens 810 and 812 to have ambient light rejection capability that is proportional to the ratio of the difference between the dimensions of the entire bases of the micro-lenticular lenses and the entire bases of the micro-prisms, to the dimension of the entire bases of the micro-lenticular lenses. Stated differently, the Micro-lens Screen System 800 comprising the two Collimation Screens 810 and 812 will have ambient light rejection capability along both its horizontal and vertical axes that is proportional to the ratio of the difference between the square of a linear dimension of the base of a micro-lens and the square of a linear dimension of the base of a micro-prism, to the square value of the linear dimension of the base of the micro-lens. Depending on the design tolerance margin allowances, the ambient light rejection capabilities of the two Collimation Screens 810 and 812 can be made to allow the Micro-lens Screen System 800 of this embodiment of the invention to have ambient light rejection capability that could be greater than 65%.

As illustrated in FIG. 8B, each of the micro-prisms 830 on the viewing side 801 of each of the Collimation Screens 810 and 812 has two optically clear exit surfaces 831 and 832 through which the light ray bundle that entered the micro-micro-element 815 through the micro-lenticular lenses 820 would be refracted as it exits the micro-micro-element 815. The exit surfaces may be planar, circular, parabolic or elliptical. The center of each of the two exit surfaces 831 and 832 is defined as the exit point of the central (principal) ray of the light ray bundle that entered the micro-micro-element 815 through the center of micro-lenticular lens 820. The center of the micro-prisms 830 exit surfaces 831 and 832 as well as its inclination angle relative to the screen surface would be determined such that the principal rays from two adjacent tiled projectors that entered the micro-micro-element 815 through the center of the micro-lenticular lenses 820 would be collimated, meaning becoming substantially perpendicular to the surface of the screen, as it refracts through the exit surfaces 831 and 832.

Figure 9:
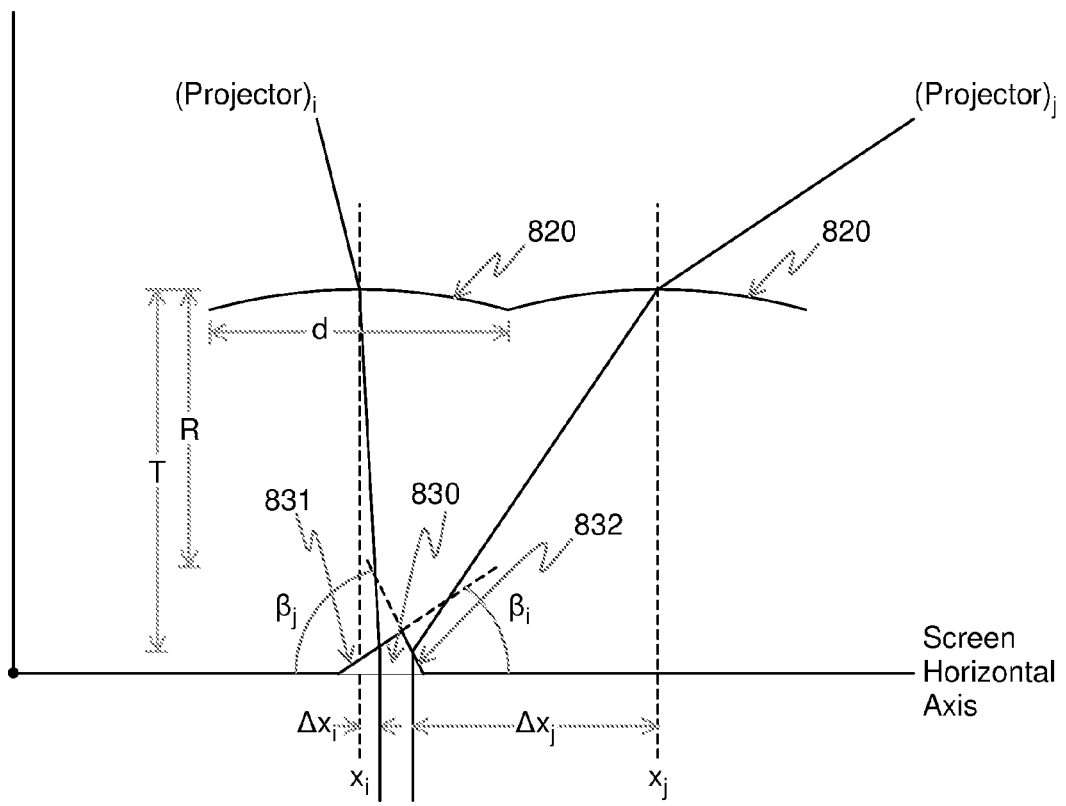
FIG. 9 illustrates a cross-sectional view of the micro-micro-element of FIG. 8B of the Micro-lens Screen System of FIG. 8A.

FIG. 8A and FIG. 8B illustrate the salient design parameters of the Collimation Screens 810 and 812. FIG. 8A illustrates a cross-sectional view of the Collimation Screen 810 micro-micro-element 815 along its horizontal axis. FIG. 8B illustrates a horizontal cross-sectional view of the Collimation Screen 812 micro-micro-element 815. Because the two Collimation Screens 810 and 812 can be viewed as a decomposition of the Collimation Screen 210 along the horizontal and vertical axes of the screen system, the salient design parameters of the Collimation Screens 810 and 812 highlighted on FIG. 9 are the same as those used earlier; namely: (1) "T" being the thickness of the Collimation Screens 810 and 812; (2) "R"; the curvature radius of the micro-lenticular lens 820; (3) "d" being the dimension of the base of the micro-lenticular lens 820; (4a) $x_i$ and $x_j$ being the position of the center of the exit surfaces 831 and 832; respectively, of the micro-prisms 830 of the Collimation Screen 810 relative to the center of the sub-image section 310 illustrated in FIG. 3 along the x-axis of the Screen System 800; (4b) $y_i$ and $y_j$ being the position of the center of the exit surfaces 831 and 832; respectively, of the micro-prism 830 of the Collimation Screen 812 relative to the center of the sub-image section 310 illustrated in FIG. 3 along the y-axis of the Screen System 800; (5a) $\Delta x_i$ and $\Delta x_j$ being the position of the center of the exit surfaces 831 and 832; respectively, of the micro-prism 830 of the Collimation Screen 810 in reference to the center of the corresponding micro-lenticular lens 820 along the x-axis of the Screen System 800; (5b) $\Delta y_i$ and $\Delta y_j$ being the position of the center of the exit surfaces 831 and 832; respectively, of the micro-prism 830 of the Collimation Screen 812 in reference to the center of the corresponding micro-lenticular lens 820 along the y-axis of the Screen System 800; (6) $\beta_i$ and $\beta_j$ being the orientation of the exit surfaces 831 and 832; respectively, of the micro-prism 830 of the Collimation Screens 810 and 812 in reference to the x-y plane of the Micro-lens Screen System 800; and (7) "b" being the dimension of the base of the micro-prisms 830 of the Collimation Screens 810 and 812.

Because the two Collimation Screens 810 and 812 can be viewed as a decomposition of the Collimation Screen 210 along the x-y axes of the screen system, Equations (1) through (11) can be used to specify the two Collimation Screens 810 and 812 design parameters which are highlighted in FIG. 9A and FIG. 9B. Specifically:

1. Equation (1) would be used to specify the thickness T of the Collimation Screens 810 and 812;

2. Equation (6) would be used to specify the sag S of the micro-lenticular lens 820 in terms of its radius of curvature R;

3. Equation (7a) would be used to specify the positional offset $\Delta x_i$ and $\Delta x_j$ of the exit surfaces 831 and 832 of the micro-prisms 830 of the Collimation Screen 810 relative to the position of the corresponding micro-lenticular lens 820 along the x-axis of the Screen System 800;

4. Equation (7b) would be used to specify the positional offset $\Delta y_i$ and $\Delta y_j$ of the exit surfaces 831 and 832 of the micro-prisms 830 of the Collimation Screen 812 relative to the position of the corresponding micro-lenticular lens 820 along the y-axis of the Screen System 800; and 5. Equation (8) would be used to specify the inclination angles $\beta_i$ and $\beta_j$ of the exit surfaces 831 and 832 of the micro-prism 830 of the Collimation Screen 810 and 812.

In referring to FIG. 3, which illustrates the collimation screen regions when the Screen System 800 is used in conjunction with a tiled display system comprised of multiple rows and columns of projectors, the Collimation Screen 810 would be comprised of a number of identical segments that equals the number of rows of tiled projectors and the Collimation Screen 812 would be comprised of a number of identical segments that equals the number of columns of tiled projectors. Based on the method outlined above for specifying the design parameters of the Collimation Screens 810 and 812, each of the segments of the Collimation Screens 810 and 812 would be symmetrically identical about the center of each segment. Within each of the identical segments of the Collimation Screens 810 and 812, the positional offset of the exit surfaces 831 and 832 of the micro-prisms 830 relative their corresponding micro-lenticular lens 820 would gradually increase with the increase in the distance from the center 350 of the sub-image section 310. Furthermore, the inclination angles of the exit surfaces 831 and 832 of the micro-prisms 830 would simultaneously and gradually increase or decrease; respectively, with the increase in the distance from the center 350 of the sub-image section 310. This simultaneous and gradual increase in the position and inclination angles of the exit surfaces 831 and 832 of the micro-prisms 830 enables the Collimation Screens 810 and 812 to: (1) effectively collimate the light projected from rows and columns of tiled projectors; and (2) maintain the exit surfaces 831 and 832 of the micro-prisms 830 near the focal depth of their corresponding micro-lenticular lens 820 (hence at a minimal blur size distance)—thus enabling the placement of the ambient light rejection coating on the flat surfaces 816 between the micro-prisms 830, which in turn enables the Collimation Screens 810 and 812 to have ambient light rejection capabilities along both axes of the Screen System 800. The ability of the Screen System 800 to collimate the light projected from rows and columns of tiled projectors while simultaneously rejecting ambient light along both of its axes is a capability that is not shared with any prior art.

Not withstanding the above discussion which illustrated the design specifications of the Screen System 800 when the micro-lenticular lens 820 has a spherical cross section, a person skilled in the art would be able to extend the design specifications for the case when the micro-lenticular lens 820 is either aspherical or ellipsoidal, by way of example, with curvature characteristics that either are the same or vary from the center to the edge of the sub-image area 310.

Not withstanding the above discussion which illustrated the design specifications of the Screen System 800 when the micro-prism 820 exit surfaces 831 and 832 are planer surfaces, a person skilled in the art would be able to extend the design specifications for the case when the micro-prism 830 exit surfaces 831 and 832 have a different shape, such as a spherical, aspherical or ellipsoidal shape.

The ambient light rejection capability of either of the two collimation screens 810 and 812 would be proportional to the ratio of the difference between the dimensions of the base of the micro-lenticular lens 820 and the base of the micro-prism 830, to the dimension of the base of the micro-lenticular lens 820. The ambient light rejection of the two collimation screens 810 and 812 collectively would enable the Micro-lens Screen System 800 to have ambient light rejection capability that is proportional to the ratio of the difference between the square value of the dimensions of the base of the micro-lenticular lens 820 and the square value of the base of the micro-prism 830, to the square value of the dimension of the base of the micro-lenticular lens 820. For example, in referring to FIG. 8B, if the dimension of the base of the micro-lenticular lens 820 is d and the dimension of the base of the micro-prisms 830 is b; then the ambient light rejection of each of the two collimation screens 810 and 812 would be equal to $\{(d-b)/d\}$ and the ambient light rejection capability of the screen system 800 comprising the two collimation screens 810 and 812 would be equal to $\{(d^2-b^2)/d^2\}$. Depending on the design tolerance margin allowances, this ratio can be made to allow the Micro-lens Screen System 800 of this invention to have ambient light rejection capability that could be greater than 65%. Unlike the prior art, the ambient light rejection capability of the Micro-lens Screen System 800 of this invention is not restricted to act only along one axis, thus allowing the Micro-lens Screen System 800 to effectively reject ambient light that would fall on the screen viewing side from any direction.

Thus as stated before, the ambient light rejection capability of the screen system is proportional to the ratio of the area of the black coating to the total area of the screen. In the case of the embodiment of FIGS. 8A and 8B, being two collimation screens acting in orthogonal axes, the black coating is actually black stripes between the bases of the micro-prisms of each one of the two collimation screens. When the projected light traverses across the first collimation screen, the micro-lenticular lens focuses the light into a narrow stripe that strikes the exit surface of the corresponding micro-prism. In other words, the projected light, when focused by a micro-lenticular lens, is concentrated into a narrow stripe that falls on the exit surface of the corresponding micro-prisms and misses the black coated stripes on the side of that micro-prism. As the "narrow stripe" of light traverses through the exit surface of the micro-prism of the first collimation, the light is collimated along the axis parallel to the axis of the micro-lens and micro-prism. As the narrow stripe of light traverses the second collimation screen, its micro-lenticular lens focuses the portion of the narrow stripe of light that falls on it into a "small spot" that strikes the exit surface of its corresponding micro-prism and misses the black coated stripes on the side of that micro-prism. As the small-spot of light traverses through the exit surface of the micro-prism of the second collimation screen, it is collimated along the axis parallel to the axis of the micro-lens and micro-prism of the second collimation screen. In effect the two collimation screens combined concentrate the projected light into the square clear aperture formed when the black stripes of the two collimation screens intersect with the black stripes of the first collimation screen defining two sides of that clear aperture and the black stripes of the second collimation screen defining the other two sides of the clear aperture. The text and the equation in page 17 are attempting to state that the ambient light rejection of the screen system of the second embodiment is proportional to the ratio area of the black coating to the total area of the screen.

Several display applications require display of a curved image, for example simulators and knowledge workers displays. In some of these applications tiled projectors are used in order to somewhat reduce, but not eliminate, the distortions caused by projecting the image on a curved screen. The challenge of totally eliminating the distortions caused by projecting a tiled image on a curved screen stems from the resultant unfavorable increase in the incidence angle on a curved screen, which in turn makes it more difficult to effectively blend the tiled sub-images, especially in the case of tiled rear projection display systems. One of the unique advantages of the Micro-lens Screen Systems 200 and 800 of this invention is the ability to tailor the screen system collimation and ambient light rejection performance on a sub pixel basis by adjusting the corresponding parameters of the constituent micro-lens and micro-cones, in the case of the Screen System 200, or micro-lens and micro-prisms, in the case of the Screen System 800, as explained earlier. Such a capability would enable the Micro-lens Screen Systems 200 and 800 of this invention to be designed to attain a collimation and ambient light rejection performance that specifically matches the required curvature of the display system—thus substantially eliminating the distortions caused by projecting a tiled image on a curved rear projection screen while simultaneously enabling effective sub-image blending performance.

In summary, the salient features of the Micro-lens Screen Systems of this invention in comparison to the prior art include:

1. It effectively collimates light from multiple projectors; thus making it possible to effectively eliminate the perceptional seams that would typically be encountered in tiled rear projection display systems;

2. It effectively collimates light from one or multiple projectors, each having a wide field of view; thus making it possible to substantially reduce the projection depth of tiled rear projection display systems;

3. It effectively collimates light from multiple projectors within the tiling overlap (blending) regions; thus making it possible to support the edge blending typically required to achieve image uniformity in tiled display systems;

4. It effectively rejects ambient light that would fall on the screen viewing side from any direction; thus substantially improving the display system black level and contrast performance;

5. It can be implemented either as a single collimation screen system (Screen System 200) or as a dual collimation screen system (Screen System 800); allowing flexibility in tooling and manufacturing to meet the display system cost and performance goals; and 6. Its collimation and ambient light rejection performance can be tailored on a sub-pixel basis to match the curvature of a curved screen display system.

Like any typical optical system, the efficiency of the present invention screen is determined by the ratio of light that falls on it and gets transmitted through to the viewing side—which is known among screen designers and users as the "screen transmittance efficiency". The overall screen transmittance efficiency is determined first by its optical ability to transfer light from its projection side to its viewing side and second by the attenuation of the projected light that may be caused by any means added to reject ambient light (in a conventional screen that is accomplished by tinting the screen). The overall transmittance efficiency is therefore equal to the screen optical transmittance multiplied by its attenuation.

Because optical transmittance of the projected light decreases as its angle of incidence on the screen increases, in a typical rear projection screen the optical transmittance varies across the screen from the center to the edge, and the present invention screen is not different in that regard. However, as previously explained, the ambient light rejection means (meaning the black coating on the viewing side of the collimation screen) of the present invention screen system does not sacrifice transmittance efficiency to achieve a substantial level of ambient light rejection, and thus screens in accordance with the present invention are capable of achieving higher overall transmittance efficiency than prior art screens.

In the foregoing description, the depressions 230 have been referred to as micro-cone depressions, truncated as shown. It should be noted however, that the important aspect of these depressions is the exit surface 231 (FIGS. 2B and 4A and 4B) they define, whether flat or not, the angle $\beta$ of the exit surface 231 (FIG. 4A) in the meridian plane containing a center or axis of the exit surface and the center of a respective sub-image, and the position of the center of the exit surface 231 relative to the center of the associated micro-lens $\Delta x_i, \Delta y_i$ (FIG. 4B). Consequently the depressions may have a cross section other than round, such as square or octagonal, and in fact do not need to have surfaces generated by straight lines emanating from an apex, though preferably the size of exit surface 231 is at least equal to the size of the image (spot) formed by each micro-lens by the light ray bundle incident on it, and the cross section of the micro-depression does not otherwise interfere with the light forming the image spot.

Accordingly, the micro-cones may be more generally referred to as micro-depressions, truncated micro-cones simply being an example of such micro-depressions. Further, the axis of the micro-depressions as shown herein is shown as being perpendicular to the viewing side 201 of the screen, though this too has been for purposes of illustration convenience, and is not a limitation of the invention. Also while the micro-lenses shown herein impliedly have the same curvature radius across each of the sub-image areas of the collimation screen, this also is not a limitation for the present invention, and may have a curvature or curvature radius that varies gradually from the center to the edge of the sub-image areas of the collimation screen.

In the foregoing description, the word collimation has been used in the sense that in the first embodiment, a principal ray of its corresponding micro-lens would be collimated as it exits the dielectric material of the Collimation Screen, meaning becoming substantially perpendicular to the surface of the screen, as it refracts through the exit surface. There will be some minor spreading of the light bundle, though the spreading of light bundles can be made substantially uniform across the area of the diffusion screen, so once one adjusts the sub-images and portions thereof so that sub-images match and the image intensity is uniform (sub-image blending not visually detectable) when viewed directly from the front of the diffusion screen, the image intensity will be uniform when viewed at any angle from the side, though typically reduced in an amount dependent on the diffusion screen used. The sub-image blending will not be visually detectable when viewed at an angle. In the second embodiment, the micro-prisms on the first collimation screen collimate the light in the sense that it is collimated in a first direction, or into planes perpendicular to the diffusion screen, with the micro-prisms on the second collimation screen collimating the light in the second direction to achieve an overall collimation of the light into spots.

The word "identical" has been used herein to describe the sub-image areas of screens in accordance with the present invention. The word identical is used in the sense that non-overlapping sub-image areas may be identical, and sub-image edge areas could be identical. However by way of example, in a 3×4 sub-image array, the part of the screen for the top left sub-image need not have a blending capability along most of its left side and along its top. Actually each of the 12 sub-image areas will have different border requirements, and could differ from each other to the extent blending is or is not required on the entirety of any particular side.

Finally of course, the projection screen of the present invention will be specifically designed in accordance with the known distance from the projectors to the screen. Therefore a screen designed for one projector-screen separation will not perform well if that separation is substantially varied.

Thus while certain preferred embodiments of the present invention have been-disclosed and described herein for purposes of illustration and not for purposes of limitation, it will be understood by those skilled in the art that various changes in form and detail may be made therein without departing from the spirit and scope of the invention.

What is claimed is:

1. A screen system for rear projection systems comprising:
a diffusion screen having a viewing side and a projection side;
two dimensional arrays of micro-lenses and collimators adjacent the projection side of the diffusion screen, the two dimensional array of micro-lenses for focusing a light bundle representing a respective local part of an image projected thereon toward the projection side of the diffusion screen, and the two dimensional array of collimators collimating the light bundle to be perpendicular to the diffusion screen;
the two dimensional arrays of micro-lenses and collimators comprising first and second screen members disposed face to face adjacent the projection side of the diffusion screen, each screen member having a linear array of micro-lenticular lenses on a projection side thereof and a linear array of prisms on a viewing side thereof aligned in the same direction as the linear array of micro-lenticular lenses, each micro-lenticular lens being configured to focus light bundles incident thereto into a line of light, each micro-prism being located relative to a respective micro-lenticular lens and having one surface thereof angled to collimate light from the micro-lenticular lens into a first plane, the first and second screen members being disposed so that the linear arrays on one screen member are orthogonal to the linear arrays on the other screen member, thereby together forming two dimensional arrays of micro-lenses and collimators;
the two collimation screens each having multiple sub-image areas;
the interior region of each sub-image area of the first collimation screen being configured to collimate into first planes perpendicular to the diffusion screen, the sub-image projected from an on-axis projector while an outer region collimates into the first planes, the sub-image projected by that projector as well as the overlapping portions of the sub-images projected by at least one adjacent projector in the same row or column of projectors; and,
the interior region of each sub-image area of the second collimation screen being configured to collimate into second planes perpendicular to the first planes and the diffusion screen, the sub-image projected from an on-axis projector while an outer region collimates into the second planes, the sub-image projected by that projector as well as the overlapping portions of the sub-image projected by an adjacent projector in the same row or column of projectors;
wherein light refracting portions of the micro-prisms each comprise two exit surfaces through either of which a light ray bundle that entered the two collimation screens through their respective micro-lenticular lenses would be refracted and collimated as it exits the micro-prisms;
the portion of each of the micro-prisms located within the non-overlapping areas of the sub-images utilizing one exit surface of the micro-prism;
the portion of each of the micro-prisms located within the overlapping areas of the sub-images utilizing both exit surfaces of the micro-prism;
thus enabling the two screens screen members to collectively collimate the light projected by an array of projectors within the non-overlapping sub-image areas, as well as within the overlapping areas of two adjacent sub-images.

2. The screen system of claim 1 wherein the two collimation screens' screen members collectively can collimate the light projected by an array of tiled projectors within the non-overlapping sub-image areas, as well as within the overlapping areas of two adjacent sub-images and a 2×2 array of four adjacent sub-images.

3. A screen system for rear projection systems comprising:
a diffusion screen having a viewing side and a projection side;
two dimensional arrays of micro-lenses and collimators adjacent the projection side of the diffusion screen, the two dimensional array of micro-lenses for focusing a light bundle representing a respective local part of an image projected thereon toward the projection side of the diffusion screen and the two dimensional array of collimators collimating the light bundle to be perpendicular to the diffusion screen;
the two dimensional arrays of micro-lenses and collimators comprising first and second screen members disposed face to face adjacent the projection side of the diffusion screen, each screen member having a linear array of micro-lenticular lenses on a projection side thereof and a linear array of prisms on a viewing side thereof aligned in the same direction as the linear array of micro-lenticular lenses, each micro-lenticular lens being configured to focus light bundles incident thereto into a line of light, each micro-prism being located relative to a respective micro-lenticular lens and having one surface thereof angled to collimate light from the micro-lenticular lens into a first plane, the first and second screen members being disposed so that the linear arrays on one screen member are orthogonal to the linear arrays on the other screen member, thereby together forming two dimensional arrays of micro-lenses and collimators;
the two collimation screens each having multiple sub-image areas;
the interior region of each sub-image area of the first collimation screen being configured to collimate into first planes perpendicular to the diffusion screen, the sub-image projected from an on-axis projector while an outer region collimates into the first planes, the sub-image projected by that projector as well as the overlapping portions of the sub-image projected by at least one adjacent projector in the same column or row of projectors; and,
the interior region of each sub-image area of the second collimation screen being configured to collimate into second planes perpendicular to the first planes and the diffusion screen, the sub-image projected from an on-axis projector while an outer region collimates into the second planes, the sub-image projected by that projector as well as the overlapping portions of a sub-image projected by one or more adjacent projectors in the same row or column of projectors;
wherein light refracting portions of the micro-prisms in the area of overlap of sub-images each comprise two exit surfaces through either of which a light ray bundle that entered the two collimation screens through their respective micro-lenticular lenses would be refracted and collimated as it exits the micro-prisms;

for micro-prisms in the area of overlap of sub-images;
the inclination angles of the first exit surfaces of each of the micro-prisms providing the angle of incidence to collimate light from a first sub-image on-axis projector;
the inclination angles of the second exit surfaces of each of the micro-prisms being the angle of incidence to collimate light from a second sub-image on-axis projector.

4. The screen system of claim 3 wherein:
each of the two collimation screens is molded from acrylic or polycarbonate using a dual sided mold having its first side manufactured to mold an array of micro-prisms on the collimation screen's viewing side and its second side being manufactured to mold an array of lenticular micro-prisms on the collimation screen's projection side.

5. The screen system of claim 3 wherein each of the micro-lenticular lenses has a curved surface that is either circular, parabolic or elliptical.

6. The screen system of claim 3 wherein the viewing side of the collimation screens is comprised of a substantially flat surface between the micro-prisms;
the flat surface between the micro-prisms being coated with a light blocking black coating, leaving the micro-prisms as the only optically clear portion on the viewing side of the collimation screens out of which light can be transmitted toward the viewing side of the screen system.

7. The screen system of claim 6 wherein the black coating between the micro-prisms enables each of the two collimation screens to have an ambient light rejection capability that is proportional to the ratio of the difference between the areas of the base of the micro-lenticular lens and the base of the micro-prism, to the area of the base of the micro-lenticular lens.

8. The screen system of claim 6 wherein the black coating between the micro-prisms enables each of the two collimation screens to have ambient light rejection capability that is proportional to the ratio of the difference between the dimensions of the base of the micro-lenticular lens and the base of the micro-prism, to the dimension of the base of the micro-lenticular lens;
enabling the screen system to have an ambient light rejection capability that is proportional to the ratio of the difference between the square value of the dimensions of the base of the micro-lenticular lens and the square value of the base of the micro-prism, to the square value of the dimension of the base of the micro-lenticular lens.

9. The screen system of claim 6 wherein the exit surfaces of the micro-prisms are located at a height from the surface of the viewing side of the two collimation screens sufficient to allow for surface level separation between the optically clear exit surfaces of micro-prisms located at the center of the sub-image area and the light blocking surface of the light blocking black coating.

10. The screen system of claim 6 wherein the light blocking black coating between the micro-prisms collectively enables the screen system to effectively reject ambient light that may fall on the viewing side of the screen system from any direction.

11. The screen system of claim 3 wherein the shape of the exit surfaces is substantially rectangular and parallel to the plane of the collimation screen when the micro-prisms are located near the center of the sub-image areas, and become inclined by an angle that gradually increases as the micro-prism location deviates from the center of the sub-image, with the width of the exit surfaces being at least equal to the line width formed by each micro-lenticular lens from a light ray bundle incident on it.

12. The screen system of claim 11 wherein the positions of the exit surfaces of the micro-prisms are not restricted to all be within the footprint of the corresponding micro-lenticular lens, thereby enabling the collimation screens to collimate a wide range of values of projection angle of incidence, in turn enabling a rear projection system to be thinner.

13. The screen system of claim 3 wherein the micro-lenticular lenses each either has the same curvature across each of the sub-image areas or has a curvature that varies gradually from the center to the edge of each of the sub-image areas.

14. The screen system of claim 3 wherein;
the viewing side of each of the two collimation screen's sub-image areas being comprised of an array of micro-prisms whose collimation characteristics are determined by: (1) the characteristics of the array of micro-lenticular lenses comprising the projection side of their respective collimation screen; (2) the projection angles of incidence on the array of micro-lenticular lenses; and (3) the selected thickness of each of the collimation screens; and,
the array of micro-prisms of the first collimation screen being comprised of rows that are parallel to the x-axis at the center of each sub-image area and the array of micro-prisms of the second collimation screen being comprised of columns that are parallel to the y-axis at the center of each sub-image area, with the positional offset of the rows of micro-prisms of the first collimation screen and columns of micro-prisms of the second collimation screen relative to the set of rows and columns of micro-lenticular lenses of their respective micro-lenticular lenses by values which gradually increase from the center to the edge of each sub-image area.

15. The screen system of claim 14 wherein the multiple sub-image areas are identical.

16. The screen system of claim 3 wherein the diffusion screen is a volume diffuser, a surface diffuser, a holographic diffuser or a beaded diffuser.

17. The screen system of claim 3 wherein the screen system is planer.

18. The screen system of claim 3 wherein the screen system is curved along at least one of its axes.

19. The screen system of claim 3 wherein the multiple sub-image areas are identical.

20. A screen system for rear projection systems comprising:
a diffusion screen having a viewing side and a projection side;
two dimensional arrays of micro-lenses and collimators adjacent the projection side of the diffusion screen, the two dimensional array of micro-lenses for focusing a light bundle representing a respective local part of an image projected thereon toward the projection side of the diffusion screen and the two dimensional array of collimators collimating the light bundle to be perpendicular to the diffusion screen;
the two dimensional arrays of micro-lenses and collimators comprise a transparent screen member having an array of micro-lenses molded into a first side of the transparent screen member, and an array of collimators in the form of micro-depressions molded into a second side of the screen opposite the first side and facing the projection side of the diffusion screen;

wherein each image comprises a plurality of projected sub-images wherein the screen system is for blending of adjacent edges of sub-images to create the image, the micro-depressions within areas of each sub-image without blending having one end surface for collimating light incident thereto from a micro-lens within that sub-image area, the micro-depressions within areas of blending of two adjacent sub-image areas having two end surfaces for collimating light incident thereto from micro-lenses within each of the two sub-image areas.

21. The screen system of claim 20 wherein the viewing side of the collimation screen between the micro-depressions is coated with a light blocking black coating, whereby the micro-depressions are the only optically clear portion out of which light can be transmitted through the collimation screen toward the viewing side of the screen system, whereby the collimation screen has an ambient light rejection that is proportional to the ratio of the difference between the areas of a micro-lens base and a micro-depression base, to the area of the base of a micro-lens.

22. The screen system of claim 21 wherein the exit surfaces of the micro-depressions are displaced from the light blocking coated surface.

23. The screen system of claim 20 wherein the curvature of the micro-lens and the thickness of the collimation screen are selected such that the image formed by each micro-lens of the light ray bundle incident on it will be at its minimum blur size at each of the sub-image corners.

24. The screen system of claim 20 wherein the micro-depressions are conical having a half apex angle at least equal to 90 degrees minus the inclination angle of the exit surfaces at the tiled sub-image corners.

25. The screen system of claim 20 wherein the micro-lens arrays associated with the sub-image areas are comprised of micro-lenses either having the same curvature across each of the sub-image areas of the collimation screen, or having a curvature that varies gradually from the center to the edge of the sub-image areas.

26. The screen system of claim 20 wherein a plurality of the micro-depressions comprising the viewing side collimation screen corresponds with one or a plurality of micro-lenses, thus enabling the collimation screen to collimate the light projected on the screen from an array of projectors.

27. The screen system of claim 20 wherein the micro-depressions each define an exit surface through which a light ray bundle that entered the collimation screen through a surface of the micro-lens would be refracted as it exits the micro-depression;

the position of the exit surfaces relative to the center of their corresponding micro-lens and their inclination angle relative to the plane of the collimation screen gradually varying from the center toward the edge of each of the sub-image areas, the center of each micro-depression exit surface and the inclination being selected so that a principal ray that enters the respective micro-element through the center of the respective micro-lens is collimated as it refracts through the exit surface of the micro-depression to be substantially perpendicular to the surface of the screen.

28. The screen system of claim 20 wherein the positions of the micro-depression exit surfaces are not restricted to all be within the footprint of the corresponding micro-lens, thereby enabling the collimation screen to collimate a wide range of values of the projection angle of incidence, in turn enabling a rear projection system to be thinner.

29. The screen system of claim 20 wherein the inclination angles of the exit surfaces of the micro-depressions gradually vary from the center of each sub-image area to the edge of the sub-image area so that the inclination angles will collimate a principal ray projected on the collimation screen, thus enabling screen systems to be designed to collimate a wide range of values of the projection angle of incidence, which in turn enables rear projection systems to have a much thinner depth.

30. The screen system of claim 20 wherein the exit surfaces of the micro-depressions are either planer, spherical, aspherical or ellipsoidal in shape.

31. The screen system of claim 20 wherein the shape of exit surfaces of the micro-depressions are substantially circular for micro-depressions located near the center of each of the sub-image areas of the collimation screen, and become elliptical in shape as the micro-depression location deviates from the center of the sub-image area, with the size of the respective exit surface being at least equal to the size of the image of the light ray bundle incident on the exit surface formed by the respective micro-lens.

32. The screen system of claim 31 wherein the micro-depressions are conical having a half apex angle at least equal to 90 degrees minus the inclination angle of the exit surfaces at the sub-image corners.

33. The screen system of claim 20 wherein the multiple sub-image areas are identical.

34. The screen system of claim 20 wherein the collimation screen between the micro-depressions is coated with a light blocking black coating, whereby the micro-depressions are the only optically clear portion out of which light would be transmitted through the collimation screen toward the viewing side of the screen system.

35. The screen system of claim 20 wherein the diffusion screen is a volume diffuser, a surface diffuser, a holographic diffuser or a beaded diffuser.

36. The screen system of claim 20 wherein the screen system is a planer screen system.

37. The screen system of claim 20 wherein the screen system is curved along at least one of its axes.

38. The screen system of claim 20 wherein exit surfaces of the micro-prisms are either planer, spherical, aspherical or ellipsoidal in shape.

39. The screen system of claim 20 for tiled projection systems wherein the micro-depressions within areas of blending of four adjacent sub-image areas having four end surfaces for collimating light incident thereto from micro-lenses within each of the four sub-image areas.

40. A screen system for rear projection systems comprising:

a diffusion screen having a side and a projection side for viewing images;

two dimensional arrays of micro-lenses and collimators adjacent the projection side of the diffusion screen, the two dimensional array of micro-lenses for focusing a light bundle representing a respective local part of an image projected thereon toward the projection side of the diffusion screen and the two dimensional array of collimators collimating the light bundle to be perpendicular to the diffusion screen;

wherein each image comprises a plurality of projected sub-images wherein the screen system is for blending of adjacent edges of sub-images to create the image, wherein the two dimensional arrays of micro-lenses and collimators comprise:

first and second screen members disposed face to face adjacent the projection side of the diffusion screen, each screen member having a linear array of micro-lenticular lenses on a projection side thereof and a linear array of prisms on a viewing side thereof aligned in the same direction as the linear array of micro-lenticular lenses, each micro-lenticular lens being configured to focus light bundles of a first projected sub-image incident thereto into a line of light, each micro-prism being located relative to a respective micro-lenticular lens and having a first surface thereof angled to collimate the line of light from the micro-lenticular lens in a first plane perpendicular to the diffusion screen, the first and second screen members being disposed so that the linear arrays on one screen member are orthogonal to the linear arrays on the other screen member whereby the two screen members collimate and focus the light into a spot;

the first screen member having the linear arrays substantially parallel to the edges of the first sub-image and an adjacent second sub-image to be blended together having a second surface of the respective prisms angled to also collimate light from a micro-lenticular lens for the second projected sub-image.

41. The screen system of claim 40 wherein the second screen member has linear arrays substantially perpendicular to the blended edges of the first and second sub-images and parallel to adjacent edges of third and fourth sub-images to be blended together, and has a second surface of the respective prisms angled to also collimate light from micro-lenticular lenses for the first, second, third and fourth projected sub-images.

* * * * *